(12) United States Patent
Jaiswal et al.

(10) Patent No.: US 12,413,517 B2
(45) Date of Patent: Sep. 9, 2025

(54) HOST AUTHENTICATION USING A NON-ADDRESSABLE DOMAIN CONTROLLER

(71) Applicant: Rubrik, Inc., Palo Alto, CA (US)

(72) Inventors: Rajesh Kumar Jaiswal, Bangalore (IN); Jiangbin Luo, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 377 days.

(21) Appl. No.: 18/119,237

(22) Filed: Mar. 8, 2023

(65) Prior Publication Data

US 2024/0305566 A1 Sep. 12, 2024

(51) Int. Cl.
| | |
|---|---|
| H04L 45/76 | (2022.01) |
| G06F 9/455 | (2018.01) |
| H04L 9/40 | (2022.01) |
| H04L 12/46 | (2006.01) |
| H04L 43/50 | (2022.01) |
| H04L 45/745 | (2022.01) |
| H04L 61/5007 | (2022.01) |

(52) U.S. Cl.
CPC .......... *H04L 45/76* (2022.05); *G06F 9/45558* (2013.01); *H04L 12/4633* (2013.01); *H04L 43/50* (2013.01); *H04L 45/745* (2013.01); *H04L 61/5007* (2022.05); *H04L 63/029* (2013.01); *H04L 63/08* (2013.01); *G06F 2009/45595* (2013.01)

(58) Field of Classification Search
CPC . H04L 45/76; H04L 61/5007; H04L 12/4633; H04L 43/50; H04L 45/745; H04L 63/029; H04L 63/018; G06F 9/45558
USPC ........................................................ 370/250
See application file for complete search history.

(56) References Cited

U.S. PATENT DOCUMENTS

| | | | |
|---|---|---|---|
| 2015/0089331 A1* | 3/2015 | Skerry | G06F 11/2289 714/799 |
| 2021/0028987 A1* | 1/2021 | Krivenok | H04L 67/1097 |
| 2023/0308475 A1* | 9/2023 | Pane | H04L 63/0435 |
| 2023/0336375 A1* | 10/2023 | Sparkman, III | H04L 63/166 |

* cited by examiner

*Primary Examiner* — Anthony Mejia
(74) *Attorney, Agent, or Firm* — Holland & Hart LLP

(57) ABSTRACT

A data management system (DMS) may support authentication of a host using a non-addressable domain controller within a network. The DMS may obtain a list of domain controllers within the network and create an account at a domain controller on the list via a virtual machine instantiated within the network and used to create a tunnel between the DMS and the virtual machine The DMS may receive, via a port, a packet from a host within the network and route the packet, using a demultiplexer configured to monitor the port, to a storage entity. The storage entity may transmit, via the port to the domain controller, a request to authenticate the host, the request bypassing the demultiplexer that is configured not to monitor the port when the storage entity operates in a client mode. The DMS may receive an indication of whether the host is authenticated from the domain controller.

20 Claims, 10 Drawing Sheets

HOST AUTHENTICATION USING A NON-ADDRESSABLE DOMAIN CONTROLLER

FIELD OF TECHNOLOGY

The present disclosure relates generally to data management, including techniques for host authentication using a non-addressable domain controller.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
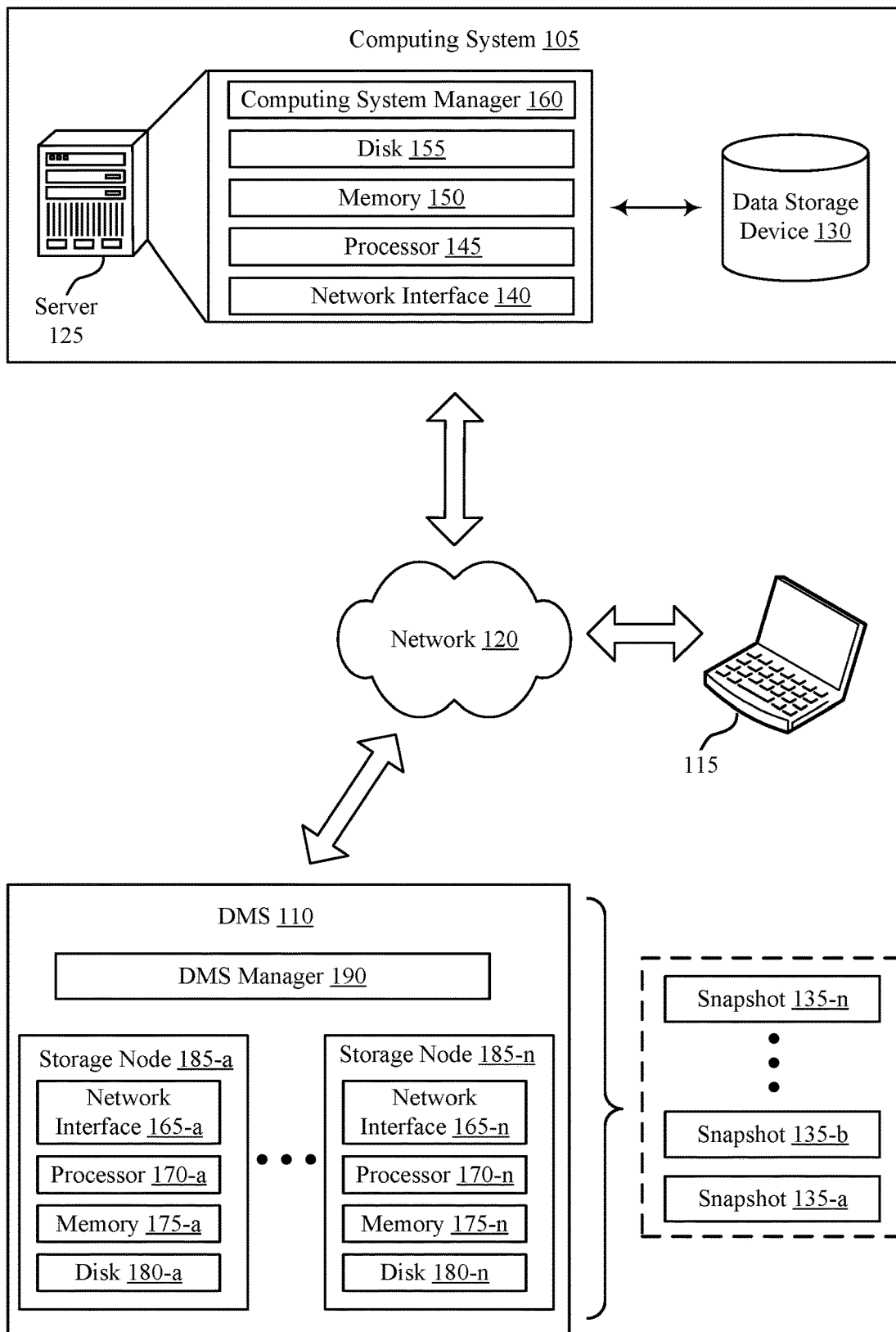
FIGS. 1, 2, and 3 illustrate examples of computing environments that support host authentication using a non-addressable domain controller in accordance with aspects of the present disclosure.

A data management system (DMS) may provide data management services (e.g., backup and recovery services) for data of a computing system. For example, the DMS may facilitate the capture (e.g., generation or ingestion) and storage of snapshots of the computing system (e.g., a computing object of the computing system such as a virtual machine, a database, a filesystem, a virtual disk, a virtual desktop, or other type of computing system or storage system), and the snapshots support later recovery (e.g., restoration) of the computing object.

The DMS may provide data management services to non-addressable (e.g., not directly addressable) computing entities. For example, some computing entities, such as hosts (among others), may be within a private network such that the DMS is unable to directly address the host. For instance, communications (e.g., packets) between the DMS and a computing entity may include internet protocol (IP) addresses to correctly route the communications. However, a non-addressable host within a private network may be associated with an IP address that is not directly reachable by the DMS. That is, the DMS may be unable to reach the host using the IP address (e.g., direct network routes between the DMS and the host may be non-existent or blocked). In cases where the DMS is unable to directly access a non-addressable host of a network (e.g., a private network), a virtual machine may be instantiated (e.g., installed) in the network to support DMS operations. For example, the virtual machine, which may be referred to as an envoy virtual machine, may create a tunnel (e.g., transport layer security TLS tunnel) between itself and the DMS to support communications between the host within the network and the DMS.

When a host attempts to access (e.g., start a connection with, send packets to) a storage entity (e.g., a server) of the DMS that is used to back up the host, the DMS may attempt to authenticate the host, which may include the DMS sending (e.g., issuing, transmitting) an authentication request to a domain controller within the network that includes the host. The domain controller may, in response to receiving an authentication request from the DMS, verify whether the DMS is authorized to issue the authentication request. Whether the DMS is authorized may depend on whether an account (e.g., a machine account) for the DMS was previously created at the domain controller. However, if a host is non-addressable (e.g., reside within a private network) and an envoy virtual machine and associated tunnel are used for communications between the host and the DMS, various issues may arise with respect to the DMS requesting the domain controller to authenticate the host.

For example, a domain name system (DNS) server may include a list of available domain controllers associated with the host (e.g., associated with a domain to which the host belongs) that the DMS may access to request authentication of the host. However, the DNS server and the domain controllers may themselves be non-addressable by the DMS (e.g., may reside within the private network). As such, the DMS may be unable to obtain the list of available domain controllers from the DNS and be unable to create an account at a domain controller to support later authentication requests. Additionally, even if the DMS were able to create a machine account at the domain controller for the host, the DMS may still be unable to successfully send authentication requests to the domain controller via the tunnel. For example, communications via the tunnel may be routed through a demultiplexing component (e.g., an "Nginx" server) within the DMS such that the communications may be routed to the correct entities. For inbound traffic to the DMS, the demultiplexing component may route packets from respective hosts to corresponding storage entities of the DMS acting as servers by mapping host internet protocol (IP) addresses associated with the packets to the corresponding storage entities. However, outbound traffic from different storage entities acting as clients to establish a connection with an external entity may all appear as generally coming from the DMS (rather than a specific storage entity). As such, the demultiplexing component may be unable to determine with which corresponding storage entity a connection is to be established and hence the connection attempt may fail (e.g., be dropped by the demultiplexing component).

To support creation of an account at a non-addressable domain controller, the DMS may utilize the envoy virtual machine to obtain the list of available domain controllers. For example, because the virtual machine is instantiated within (e.g., resides within, is located within) the network, the virtual machine may obtain the list of available domain controllers, such as from the non-addressable DNS server. The virtual machine may transmit the list of available domain controllers to the DMS via the tunnel, and the DMS may use the list to access one of the domain controllers.

To support the transmission of outgoing traffic to the domain controller, such as to create the account at the domain controller or request authentication of a host, the DMS may configure the demultiplexing component to differentiate between incoming and outgoing traffic via the tunnel for the purposes of routing the traffic. For example, traffic communicated between the DMS and a given host within the network may be communicated according to a communication protocol, such as a server message block (SMB) protocol, among others. Such traffic may be communicated via a port of the DMS allocated for the communication of the traffic (e.g., a port 445 corresponding to the SMB protocol, which may have a port number 445). The DMS may configure the demultiplexing component such that, if a storage entity operates in a server mode to receive packets (e.g., connection requests) via the port, the demultiplexing component may monitor (e.g., listen to) the port and route the packets to the storage entity. The DMS may also configure the demultiplexing component such that, if the storage entity operates in a client mode to transmit packets (e.g., connection requests such as to support account creation and authentication requests) via the port, the demultiplexing component may not monitor (e.g., not listen, refrain from monitoring, refrain from intercepting, be disabled from monitoring) the port, and as such, the packets may bypass the demultiplexing component. As a result, outgoing traffic from the storage entity via the port will not be intercepted and dropped by the demultiplexing component. Instead, a connection may be established between the storage entity and the domain controller such that traffic is routed between them without interception by the demultiplexing component. The DMS may create an account at the domain controller, request authentication of a host within the network, or both, via the connection established.

FIG. 1 illustrates an example of a computing environment 100 that supports host authentication using a non-addressable domain controller in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing. wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-intime version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta-of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the computing system 105 may be included in a network that is separate from a network within which the DMS 110 is located. In some cases, the computing system 105 (e.g., components of the computing system 105) may be associated with an IP address that is not directly reachable by the DMS 110, and thus the DMS 110 may be unable to reach the computing system 105 using the IP address. Here, an envoy virtual machine associated with (e.g., that is considered a part of) the DMS 110 may be instantiated within the network that includes the computing system 105, and the envoy virtual machine may create a tunnel between the networks (e.g., between the envoy virtual machine and the DMS), such that packets may be communicated between the DMS 110 and computing system 105 via the tunnel.

In accordance with examples described herein, the DMS 110 may support authentication of the computing system 105 in response to the computing system 105 requesting to establish a connection with the DMS. For example, the network that includes the computing system 105 may include one or more non-addressable domain controllers (e.g., domain controllers having IP addresses that are not directly reachable by and/or unknown to the DMS 110). Because the envoy virtual machine is instantiated within (e.g., resides within, is located within) the network, the virtual machine may obtain a list of the one or more non-addressable domain controllers, such as from a non-addressable DNS server, and transmit the list to the DMS 110 via the tunnel. The DMS 110 may use the list to create an account at a domain controller on the list such that the DMS 110 may subsequently send authentication requests to the domain controller. To support creation of the account and transmission of the authentication requests, the DMS 110 may configure a demultiplexer of the DMS 110 to not monitor (e.g., exclude monitoring of) a port via which a packet (e.g., a connection request) from the DMS 110 to the domain controller is communicated. As such, the packet may not be intercepted by the demultiplexer, which may lead to dropping of the packet, and instead a connection between the DMS 110 and the domain controller may be established to support account creation and authentication of non-addressable hosts.

Figure 2:
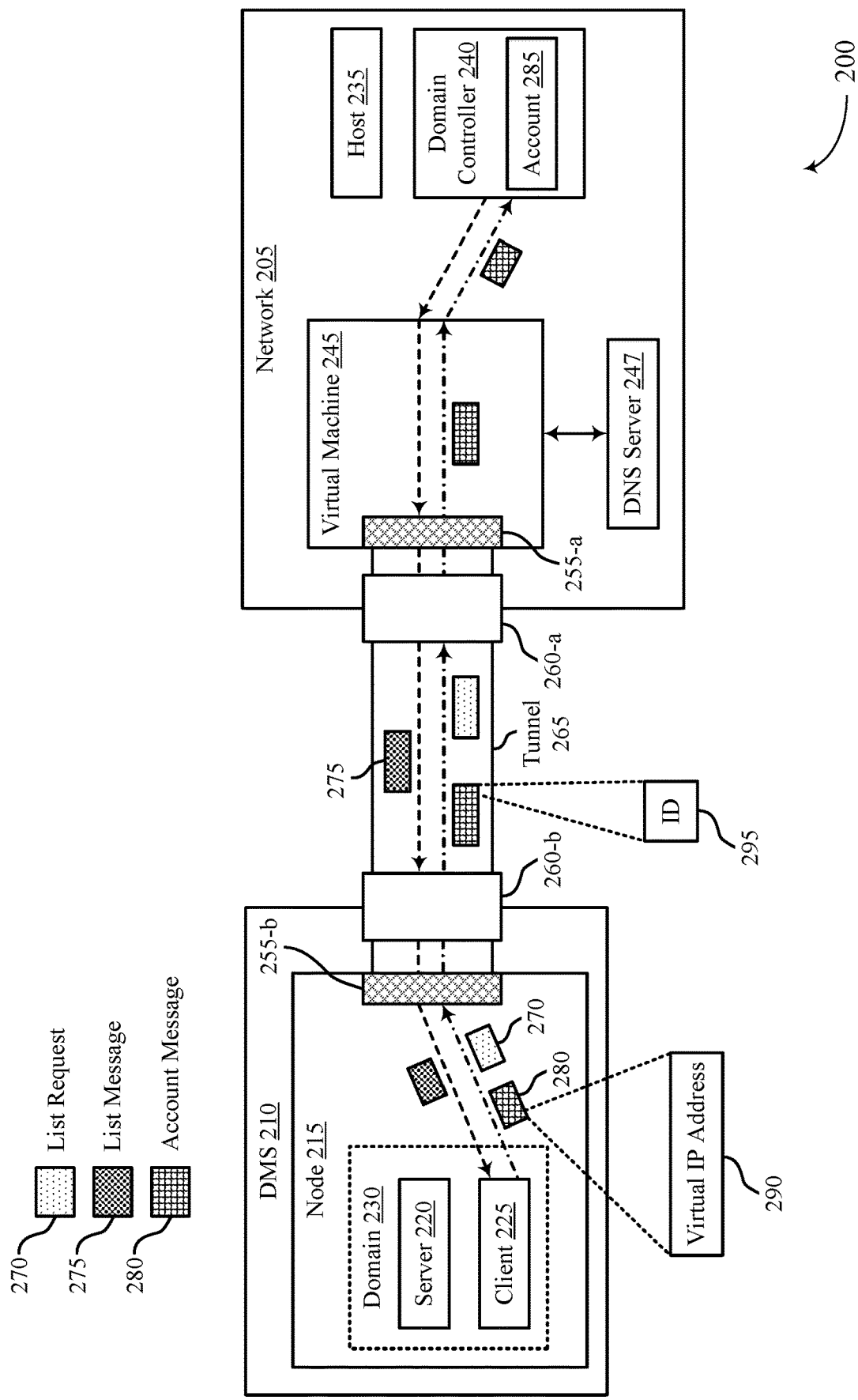

FIG. 2 illustrates an example of a computing environment 200 that supports host authentication using a non-addressable domain controller in accordance with aspects of the present disclosure. The computing environment 200 may implement or be implemented by aspects of the computing environment 100 described with reference to FIG. 1. For example, the computing environment 200 may include a DMS 210, which may be an example of a DMS 110 described herein, including with reference to FIG. 1. The computing environment 200 may support the creation of an account (e.g., a machine account) for the DMS 210 at a non-addressable domain controller 240) such that authentication of a non-addressable host 235 may be supported (e.g., as described with reference to FIGS. 3 and 4).

The computing environment 200 may include a network 205. The network 205 may include various computing entities that are backed up by the DMS 210. For example, the network 205 may include one or more hosts 235 (although a single host 235 is depicted in the example of FIG. 2), which may be examples of one or more components of a computing system 105, such as including aspects of a server 125, a data storage device 130, or a combination thereof. In some examples, a host 235 may be a computing entity, such as a hypervisor, that provides underlying hardware resources, such as processing power, memory, network, and storage during virtualization. In some examples, the host 235 may be a bare-metal hypervisor installed directly on the hardware of a physical machine, between the hardware and the operating system. In some examples, the host 235 may be an example of a VMWare host, such as an ESX host or an ESXi host.

The DMS 210 may include various storage entities that are used to back up respective hosts 235. For example, the DMS 210 may include a server 220 that is used to back up the host 235. For instance, packets transmitted by the host 235 may be routed to the server 220 that backs up the host 235. The DMS 210 may also include a client 225 that supports the DMS 210 establishing a connection with an entity external to the DMS 210, such as entities within the network 205 (e.g., the host 235, a domain controller 240)). In some examples, the server 220 and the client 225 may be included in a same storage entity. In some examples, the server 220 and the client 225 may be the same storage entity that supports operating as the server 220 and the client 225. For example, communications with the server 220) may correspond to the storage entity operating in a server mode, and communications with the client 225 may correspond to the storage entity operating in a client mode. In some examples, the server 220 and the client 225 may be respective examples of or included in a storage node 185 described with reference to FIG. 1. In some examples, the DMS 210 may include a node 215, which may be an example of a storage node 185.

The DMS 210 may support protecting and managing a variety of workloads that rely on various communication protocols, such as an SMB protocol, for backup and/or restore functionality. To secure (e.g., protect) access to the DMS 210 (such as by the host 235), the DMS 210 may support authentication of clients (e.g., an entity attempting to establish a connection with another entity, such as the host 235) trying to access the DMS 210 (e.g., the server 220, which may be referred to as an SMB share). In some examples, the DMS 210 may support active directory-based authentication of hosts 235, which may include accessing a domain controller 240. For example, the network 205 may include the domain controller 240, which may be an example of a server responsible for managing network and identity security requests, such as by authenticating whether a given user (e.g., host 235) is authorized to access the resources in a given domain 230. The domain controller 240 may authenticate and validate users on the network 205, including group policies, user credentials, and computer names to determine and validate user access. The server 220 and the client 225 may be associated with a domain 230 (e.g., identified by a domain name). Accordingly, by accessing the domain controller 240, the DMS 210 may determine whether the host 235 is authorized (e.g., permitted) to access the domain 230 (e.g., the server 220).

However, the domain controller 240 may be non-addressable from the perspective of the DMS 210. That is, the domain controller 240 may have an IP address (e.g., a private IP address) that is not directly reachable by (e.g., and unknown to) the DMS 210, which may result in various obstacles preventing the DMS 210 from accessing the domain controller 240) to authenticate the host 235. For example, prior to requesting the domain controller 240 to authenticate the host 235, the DMS 210 (e.g., the node 215, the client 225) may create an account 285 for the DMS 210 (e.g., the node 215, the client 225) at the domain controller 240, which may be an example of a machine account. Creation of the account 285 may indicate that the DMS 210 is authorized to access the domain controller 240), such as to request authentication of the host 235. However, because the domain controller 240 may be non-addressable and the IP address of the domain controller 240 may be unknown to the DMS 210, the DMS 210 may be unable to initiate the establishment of a connection with the domain controller 240) to create the account 285 at the domain controller 240).

For example, in some cases, the DMS 210 may obtain the IP address of the domain controller 240 by accessing a DNS server 247, which may include a database of the IP addresses of the available domain controllers 240 within the network 205. However, the DNS server 247 may also be included in the network 205 and may be non-addressable from the perspective of the DMS 210. Accordingly, the DMS 210 may be unable to access the DNS server 247 to obtain the IP address of the domain controller 240 and may thus be unable to access the domain controller 240. Further, in some cases, even if the IP address were obtained from the DNS server 247, the IP address may be a private IP address of the DMS 210, which may not be directly reachable by the DMS 210.

To support communications between the DMS 210 and entities within the network 205, a virtual machine 245 may be instantiated within the network 205. The virtual machine 245 may be an envoy virtual machine that is configured to create a tunnel 265 between the virtual machine 245 and the DMS 210 (e.g., the node 215) via which communications between the DMS 210 (e.g., the node 215, the server 220, the client 225) and the network 205 (e.g., the host 235, the domain controller 240) may be communicated. Communications (e.g., messages, packets) between the DMS 210 network 205 via the tunnel 265 may be routed via (e.g., through) various entities. In some examples, the tunnel 265 may be created between software processes 255 at the virtual machine 245 and the node 215. For example, the virtual machine 245 may use (e.g., implement, execute, run) a software process 255-*a*, and the node 215 may use a software process 255-*b*. In some examples, the software processes 255 may support packet forwarding from various sockets via a single secure tunnel, such as the tunnel 265, which may be a TLS tunnel. For example, the software processes 255 may implement TLS tunneling to forward packets via the tunnel 265. In some examples, the software processes 255 may be referred to as TLS tunneling processes.

Additionally, in some cases, the communications may be routed through respective translators 260 (e.g., a network address translator (NAT) devices) associated with the node 215 and the network 205 (e.g., a translator 260-*a* associated with the network 205, a translator 260-*b* associated with the node 215). The translators 260 may be configured to translate IP addresses (e.g., source IP addresses, destination IP addresses) included in the communications from private IP addresses to public IP addresses (e.g., and vice versa). For example, the translator 260-*a* may translate private IP addresses of the host 235 and the domain controller 240 to a public IP address of the network 205, and vice versa. The translator 260-*b* may translate private IP addresses of the server 220 or client 225 to a public IP address of the DMS 210 (e.g., the node 215), and vice versa.

The DMS 210 may utilize the virtual machine 245 to create the account 285 at the non-addressable domain controller 240. For example, because the virtual machine 245 is instantiated (e.g., resides, is located) within the network 205, the virtual machine 245 may be able to obtain a list of one or more domain controllers 240 within the network 205 that are available for accessing by the DMS 210. For instance, the virtual machine 245 may access the DNS server 247 to obtain the IP addresses (e.g., the private IP addresses) of the one or more domain controllers 240, which may include the domain controller 240. In some examples, the virtual machine 245 may obtain the list of domain controllers 240 in response to a request from the DMS 210. For example, the DMS 210 (e.g., the node 215, the client 225) may transmit a list request 270 to the virtual machine 245 via the tunnel 265 that requests for the virtual machine 245 to obtain the and transmit the list to the DMS 210. In some examples, the virtual machine 245 may be configured to obtain and transmit the list to the DMS 210 after instantiation within the network 205 (e.g., without an explicit request from the DMS 210). The virtual machine 245 may transmit the list to the DMS 210 (e.g., the node 215, the client 225) via a list message 275. In some examples, the list message 275 may include the private IP addresses of the one or more domain controllers 240 included in the list (e.g., the list may be a list of the private IP addresses).

Because the DMS 210 obtains the list of domain controllers 240) via the virtual machine 245, the DMS 210 may refrain from accessing (e.g., attempting to access) the DNS server 247. For example, the virtual machine 245 may access the DNS server 247 instead of the DMS 210 such that directly accessing the DNS server 247 by the DMS 210 may be unnecessary. In some examples, the DMS 210 may maintain an up-to-date list of the domain controllers 240 via the virtual machine 245. For example, the DMS 210) may use (e.g., execute, run, maintain) a background job to maintain the list of domain controllers 240 up-to-date, such as if there is a change to which domain controllers 240 within the network 205 are available.

The DMS 210 may use the list of domain controllers 240 received via the list message 275 to create the account 285 at the domain controller 240. For example, the DMS 210 may select the domain controller 240 from the list of domain controllers 240 at which to create the account 285. To support transmission of a packet to the selected domain controller 240), the DMS 210 may allocate a virtual IP address 290 to the domain controller 240. For example, the list of domain controllers 240 may include the private IP address of the domain controller 240, which may be unknown to the DMS 210 prior to the list being obtained. However, the private IP address may be private and may thus not be directly reachable by the DMS 210. But the private IP address of the domain controller 240 may be reachable by the virtual machine 245.

Allocation of the virtual IP address 290 to the domain controller 240 may enable the virtual machine 245 to route an account message 280), transmitted by the DMS 210 (e.g., the node 215, the client 225), to the domain controller 240, where the account message 280) requests (e.g., supports) the creation of the account 285 at the domain controller 240. For example, after (e.g., in response to) obtaining the list of domain controllers 240), the DMS 210) may allocate a respective virtual IP address 290 to each domain controller 240) included in the list. The virtual IP address 290 may indicate to which domain controller 240 the virtual machine 245 is to route (e.g., forward) the account message 280. For example, the account message 280), as received at the software process 255-b, may include the virtual IP address 290 allocated to the domain controller, such as being the destination IP address of the account message 280) or being included in addition to the destination IP address of the account message 280) (e.g., which may be the IP address of the network 205).

In some examples, the virtual IP address 290 may be allocated from a loopback address space. For example, the loopback address space may be a reserved IP address (e.g., that starts from 127.0.0.0 and ends at 127.255.255.255) that enables the DMS 210 (e.g., the node 215) to send and receive its own packets. In some examples, the virtual IP address 290 may be an IP address within the loopback address space such that a loopback interface may be used to forward the account message 280 while identifying the corresponding domain controller 240).

The software process 255-b may forward the account message 280 to the virtual machine 245 via the tunnel 265. The account message 280, as communicated via the tunnel 265, may include an identifier 295 associated with the domain controller 240. In some examples, the identifier 295 may be the virtual IP address 290. In some examples, the identifier 295 may be some other identifier associated with the domain controller 240 that the software process 255-b may bind (e.g., add, insert, append) to the account message 280) based on the virtual IP address 290 included in the account message 280 as received at the software process 255-b. The virtual machine 245 may include a mapping (e.g., a routing configuration) that maps the identifier 295 to the private IP address of the domain controller 240 (e.g., maps the virtual IP address 290 to the private IP address of the domain controller 240, maps the identifier bound to the account message 280 to the private IP address of the domain controller 240). Accordingly, using the mapping, the virtual machine 245 may route the account message 280) to the domain controller 240. The domain controller 240) may create the account 285 for the DMS 210 based on (e.g., in response to) receiving the account message 280. In this way, the DMS 210 may support the creation of the account 285 at the non-addressable domain controller 240 such that the DMS 210 may subsequently be authorized to request authentication of the host 235, as described with reference to FIGS. 3 and 4.

In some examples, the DMS 210 (e.g., the node 215, the client 225) may transmit a packet, using the virtual IP address allocated to the domain controller 240, requesting to establish a connection with the domain controller 240 prior to the transmission of the account message 280), and the DMS 210 may transmit the account message 280 via the established connection (e.g., without inclusion of the virtual IP address 290). In some examples, the account message 280 may include or be an implicit request to establish the connection with the domain controller 240. In some examples, the domain controller 240) may transmit a packet to the DMS 210 (e.g., the node 215, the client 225) indicating a confirmation of the creation of the account 285 at the domain controller 240).

In some examples, communication of the list request 270), the list message 275, the account message 280), or a combination thereof, may bypass a demultiplexer 346, as described with reference to FIG. 3 in reference to the communication of an authentication request 350) and an authentication message 352.

Figure 3:
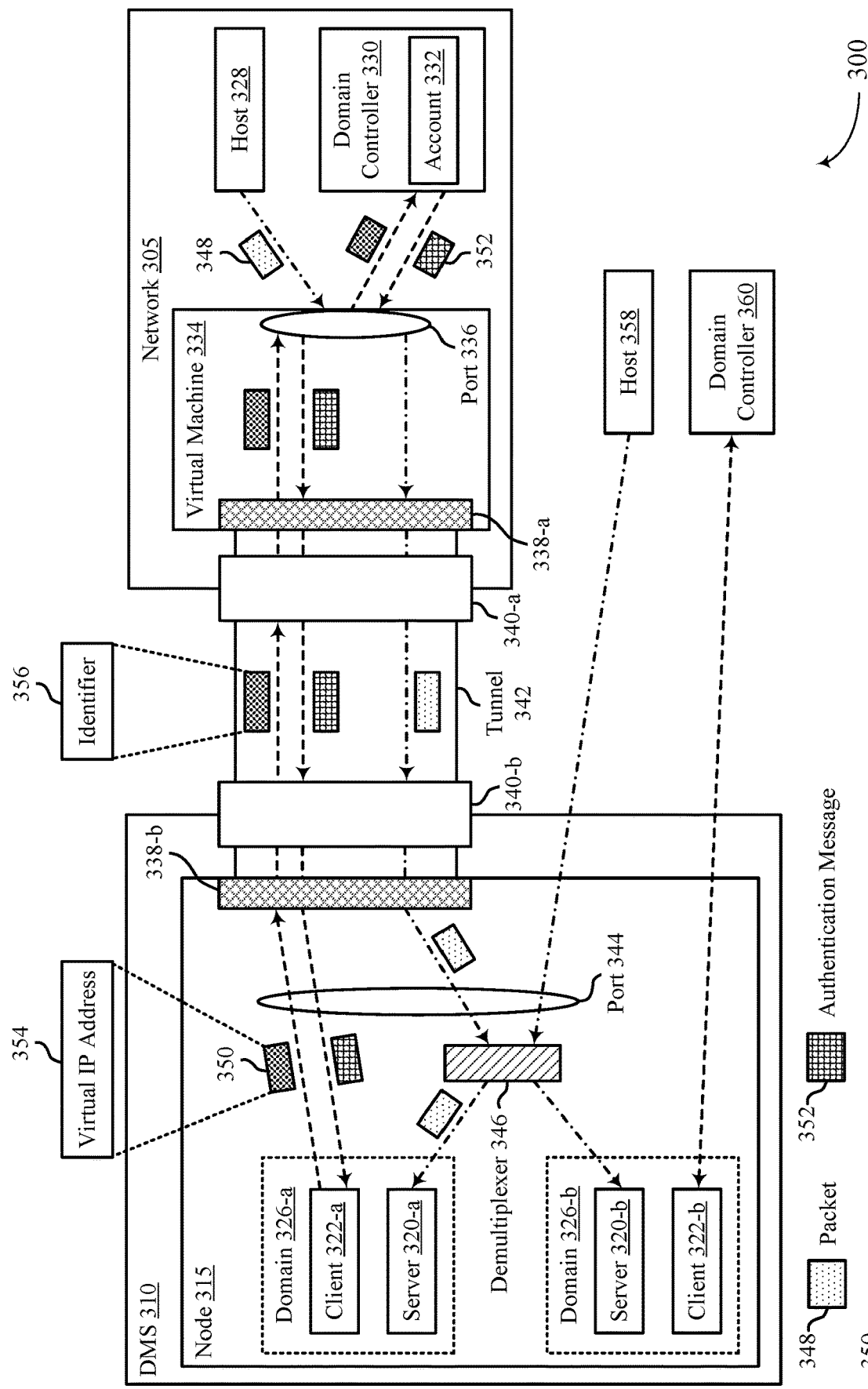

FIG. 3 illustrates an example of a computing environment 300 that supports host authentication using a non-addressable domain controller in accordance with aspects of the present disclosure. The computing environment 300 may implement or be implemented by aspects of the computing environments 100 and 200 described with reference to FIGS. 1 and 2. For example, the computing environment 300 may include a DMS 310, which may be an example of a DMS 110 or 210 described herein, including with reference to FIGS. 1 and 2. The computing environment 300 may support the authentication of and establishment of a connection with a non-addressable host 328 using a non-addressable domain controller 330.

The computing environment 300 may include a network 305, which may be an example of a network 205 described with reference to FIG. 2. The network 305 may include the host 328 and the domain controller 330, which may be examples of a host 235 and a domain controller 240 described with reference to FIG. 2. The DMS 310 may include a node 315, which may be an example of a node 215. The node 315 may include one or more servers 320 (e.g., a server 320-a and 320-b) and one or more clients 322 (e.g., a client 322-a and 322-b), which may be examples of a server 220 and a client 225, respectively. For example, in the example of FIG. 3, the server 320-a and the client 322-a may be associated with a domain 326-a (e.g., a domain 230) and the server 320-b and the client 322-b may be associated with a domain 326-b (e.g., a domain 230).

A virtual machine 334 may be instantiated within the network 305 to support communications between the network 305 and the DMS 310, as described with reference to the virtual machine 245 of FIG. 2. For example, the virtual machine 334 may create a tunnel 342 (e.g., a tunnel 265) between the DMS 310 and the network 305, such as between a software process 338-a at the virtual machine 334 and a software process 338-b at the node 315, which may be examples of the software processes 255. As described with reference to FIG. 2, the DMS 310 may obtain a list of domain controllers 330 within the network 305 and use the list of domain controllers 330 to create an account 332 (e.g., an account 285) at the domain controller 330 for the DMS 310 (e.g., the node 315, the client 322-a). Additionally, as described with reference to FIG. 2, the DMS 310 may allocate (e.g., assign) a virtual IP address 354 to the domain controller 330 for use in transmitting packets to the domain controller 330.

The host 328 may attempt to establish a connection with the server 320-a that is used to back up the host 328. For example, the host 328 may transmit a packet 348 to the DMS 310 that is associated with a request to establish the connection with server 320-a. For instance, the packet 348 may explicitly request to establish the connection with the server 220-a. Additionally or alternatively, the packet 348 may include other information, such as information associated with a snapshot 135 or a restore command (among other types of information), which, in some cases, may function as an implicit request to establish the connection (e.g., if the request is excluded from the packet 348).

The packet 348 may be routed via various entities to be received at the corresponding server 320-a. For example, the host 328 may access (e.g., establish a connection with, communicate with) the server 320-a by connecting to an IP address (e.g., a live-mountable IP address) associated with the DMS 310 (e.g., the node 315 where the server 320-a is running), where the IP address may be included in (e.g., exposed to the host 328 by) the virtual machine 334. That is, to transmit a packet 348 to the server 320-a, the host 328 may transmit (e.g., send, forward) the packet 348 to the virtual machine 334, and the packet 348 may include a destination IP address of the IP address associated with the DMS 310. The virtual machine 334 may receive the packet 348 via a port 336, which may be an example of a network file system (NFS) listening port (e.g., a port having a port number of 2049) or an SMB port (e.g., a port having a port number 445), among other ports via which the virtual machine 334 may receive the packet 348. The virtual machine 334 may transmit (e.g., forward) the packet 348 to the node 315 via the tunnel 342 using the software process 338-a. The packet 348 may also be routed via a translator 340-a associated with the network 305 and a translator 340-b associated with the DMS 310, which may be examples of the translators 260-a and 260-b, respectively.

The node 315 may use the software process 338-b to determine a port of the node 315 to which to forward the packet 348. For example, the node 315 may include various ports (e.g., virtual points of a network connection) via which different types of traffic may be received. Ports may support the differentiation between different types of traffic, and each port may be reserved for one or more communication protocols. In some examples, communications between the server 320-a and the hosts 328 and between the client 322-a and the domain controller 330 may be communicated according to (e.g., using) an SMB protocol (among other possible communication protocols). The software process 338-b may identify the communication protocol according to which the packet 348 is communicated (e.g., the SMB protocol) and may forward the packet to a port 344 corresponding to the communication protocol. In some examples, the port 344 have a port number of 445.

The node 315 may include a demultiplexer 346 that is configured to monitor for packets 348 received via the port 344 (e.g., listen to SMB connections at the port 344) and to route (e.g., forward) the packets 348 to a corresponding server 320 (e.g., the server 320-a) based on a source IP address of the packet 348. For example, the destination IP address of the packet 348 may be the IP address associated with the DMS 310 (e.g., the IP address of the node 315) but may not be specific to the server 320-a for which the packet 348 is intended. As such, routing to the proper server 320 may be unsupported using the destination IP address alone. Instead, to route the packet 348 to the proper server 320, the demultiplexer 346 may include a routing configuration that maps respective source IP addresses to respective domains 326. The hosts 328 may be associated with a respective domain 326 (e.g., the domain 326-a) such that traffic from a respective host 328 may be routed to the corresponding server 320-a via the demultiplexer 346 and in accordance with the routing configuration.

As part of forwarding (e.g., routing) the packet 348 to the port 344, the source IP address of the packet 348 may be dropped. For example, after the packet is received at the node 315, the software process 338-b may drop the IP address (e.g., an IP address of the network 305, such as a private or public IP address of the network 305) included as the source IP address of the packet 348 (e.g., in conjunction with forwarding the packet 348 to the port 344). To support routing of the packet 348 to the server 320-a, the DMS 310 may allocate a virtual IP address to the host 328 (e.g., a virtual IP address having an IP address within the loopback address space such that the packet 348 may be forwarded on a loopback interface). For example, the DMS 310 may allocate the virtual IP address to the host 328 and generate the routing configuration such that it maps virtual IP addresses to respective domains 326. After the source IP address of the packet 348 is dropped, the software process 338-b may set the source IP address of the packet 348 to be the virtual IP address allocated to the host, for example, based on an identifier of the host 328 included in the packet 348 (e.g., which may be or be used to identify the virtual IP address). Accordingly, when the packet 348 is received (e.g., intercepted) by the demultiplexer 346, the demultiplexer 346 may route the packet 348 to the server 320-a in accordance with the routing configuration and the setting of the source IP address to be the virtual IP address. In some examples, the demultiplexer 346 may be an example of an Nginx server, and the routing configuration may be an example of a Nginx configuration file (e.g., an nginx.config file).

The DMS 310 may support authentication of whether the host 328 is authorized (e.g., permitted) to access the server 320-a before establishing the connection with the host 328. For example, in response to receiving the packet 348, the DMS 310 may attempt to establish a connection with the domain controller 330 to request for the domain controller 330 to authenticate the host 328 (e.g., indicate whether the host 328 is authorized to access the server 320-a). For instance, the client 322-a may transmit an authentication request 350 to the domain controller 330 that requests the domain controller 330 to authenticate the host 328. In some cases, however, the authentication request 350 (e.g., or a prior packet requesting to establish the connection with the domain controller 330, for example, if the authentication request 350) is transmitted after the connection is established) may be intercepted by the demultiplexer 346 and dropped.

For example, connection requests initiated within the DMS 310 from different domains 326 may include the same source IP address. Additionally, the connection requests may be communicated via the port 344 (e.g., port number 445 due to be communicated in accordance with the SMB protocol), which the demultiplexer 346 may be configured to monitor. As such, the demultiplexer 346 may be configured to intercept packets communicated via the port 344 to support route the packets to a corresponding destination. However, because the packets from different domains 326 include the same source IP address (e.g., an IP address associated with the node 315), the routing configuration may exclude a mapping from the source IP address of the packet, as such a mapping would be unable to distinguish between different clients 322 that sent the packet. Accordingly, the authentication request 350 transmitted by the client 322-a may be intercepted by the demultiplexer 346 and dropped, as it may be unclear with which client 322 the connection is to be established. As such, the DMS 310 may be unable to connect with the domain controller 330 to request authentication of the host 328 in response to the packet 348.

To support establishing a connection with the domain controller 330 (e.g., such as to transmit the authentication request 350 and an account message 280, among other purposes), connection requests received from outside of the DMS 310 (e.g., from within the network 305) may be distinguished from connection requests initiated from within the DMS 310 to avoid interception of connection requests initiated within the DMS 310 by the demultiplexer 346. For example, a storage entity that backs up the host 328 may operate as the server 320-a and the client 322-a. The storage entity may operate in a server mode if operating as the server 320-a and may operate in a client mode if operating as the client 322-a. That is, if the storage entity operates as the server 320-a to receive a connection request from the host 328 (e.g., receive the packet 348) via the port 344, the storage entity may be said to operate in the server mode. Similarly, if the storage entity operates as the client 322-a to transmit (e.g., initiate) a connection request (e.g., the authentication request 350), an account message 280) with the domain controller 330, the storage entity may be said to operate in the client mode.

The DMS 310 may configure the demultiplexer 346 to monitor (e.g., listen to) the port 344 when (e.g., if) the storage entity operates in the server mode such that the packet 348 may be properly routed to the server 320-a. The DMS 310 may also configure the demultiplexer 346 to not monitor (e.g., not listen to, refrain from monitoring, be disabled) the port 344 when the storage entity operates in the client mode. As such, the packets transmitted by the client 322-a (e.g., the authentication request 350, the account message 280) may not be intercepted by the demultiplexer 346, which may prevent dropping of these packets by the demultiplexer 346. That is, the packets transmitted by the client 322-a may bypass the demultiplexer 346 to avoid being intercepted and dropped by the demultiplexer 346.

As described with reference to FIG. 2, the packets transmitted by the client 322-a may include a virtual IP address 354 (e.g., a virtual IP address 290) allocated to the domain controller 330 to support reaching the domain controller 330 (e.g., routing of the packets to the domain controller 330 by the virtual machine 334). For example, these packets, as communicated via the tunnel 342, may include an identifier 356 (e.g., an identifier 295) associated with the domain controller 330. In some examples, the identifier 356 may be the virtual IP address 354 or be some other identifier associated with the domain controller 330 that the software process 338-b may bind (e.g., add, insert, append) to the packets based on the virtual IP address 354 included in the packets as received at the software process 338-b. The virtual machine 334 may use a mapping (e.g., a routing configuration) that maps the identifier 356 to a private IP address of the domain controller 330 to route these packets to the domain controller 330).

In some examples, the DMS 310 may configure the demultiplexer 346 to monitor or not monitor the port 344 based on a virtual interface (e.g., a virtual IP address) used to communicate a packet. For example, the node 315 may be associated with (e.g., allocated) a first virtual IP address at which the node 315 receives packets via the tunnel 342. The DMS 310 may configure the demultiplexer 346 to intercept and route packets received via the tunnel 342 using the virtual IP address associated with the node 315. For example, the software process 338-b may set (e.g., bind) the first virtual IP address as a destination IP address of packets received via the tunnel 342 (such as to support a loopback-to-loopback connection), and the DMS 310 may configure the demultiplexer 346 to monitor the port 344 for packets having the first virtual IP address as the destination IP address. The DMS 310 may configure the demultiplexer to refrain from intercepting packets communicated (e.g., transmitted from within the node 315, such as from the client 322-a) using the virtual IP address allocated to the domain controller 330.

The domain controller 330 may authenticate the host 328 in response to the authentication request 350. For example, the domain controller 330 may receive the authentication request 350 and determine whether the host 328 is authorized to access the server 320-a (e.g., the domain 326-a). The domain controller 330 may transmit an authentication message 352 to the client 322-a that indicates whether the host 328 is authorized to access the server 320-a. If the host 328 is authorized to access the server 320-a (e.g., if the host 328 is authenticated), the DMS 310 (e.g., the server 320-a) may establish the connection between the server 320-a and the host 328 via which additional packets may be communicated. If the host 328 is not authorized to access the server 320-a, the DMS 310 may drop the connection (e.g., refrain from establishing the connection). In the example of FIG. 3, the authentication message 352 may indicate an authentication of the host 328, and the DMS 310 (e.g., the server 320-a) may establish the connection with the host 328.

The authentication message 352 may be communicated via the same path as the authentication request 350 (e.g., but in the reverse direction). As such, the authentication message 352 may similarly bypass the demultiplexer 346 as it is routed to the client 322-a based on being in response to the authentication request 350. For example, the authentication message 352 may be communicated via the virtual interface with the domain controller 330 (e.g., using the virtual IP address allocated to the domain controller 330).

As shown in the example of FIG. 3, the DMS 310 may also support communication with a host 358 and a domain controller 360. The host 358 and the domain controller 360 may be directly addressable by the DMS 310. That is, the host 358 and the domain controller 360 may have IP addresses that are directly reachable by the DMS 310. The server 320-*b* and the client 322-*b* may be used to provide backup, recovery, and authentication services for the host 358 and the domain 326-*b*. Because the IP addresses may be directly reachable by the DMS 310, communications between the host 358 and the server 320-*b* and between the client 322-*b* and the domain controller 360 may be communicated without the usage of virtual IP addresses (e.g., using the directly reachable IP addresses).

In an example, such as the example of FIG. 3, the node 315 may be configured to provide backup and recovery services to the network 305 having one client host (e.g., the host 328). The host 328 within the network 305 may be a part of the domain 326-*a* having a single domain controller (e.g., the domain controller 330), and connectivity between the node 315 and the network 305 may be through the tunnel 365. The node 315 may also be configured to provide backup and recovery services to the host 358 having direct connectivity with the node 315. The host 358 may be a part of the domain 326-*b* having a single domain controller (e.g., the domain controller 360). In this example, an example routing configuration of the demultiplexer 346 may be as follows:

```
geo $remote_addr $backend {
    127.128.1.35 Domain1.com;
    10.0.178.124 Domain2.com;
}
upstream Domain1.com {
    server 127.0.0.138:1445;
}
upstream Domain2.com {
    server 127.0.0.139:1445;
}
server {
    listen 10.0.39.214:445;
    proxy_timeout 7d;
    proxy_pass $backend;
}
server {
    listen 127.128.2.0:445;
    proxy_timeout 7d;
    proxy_pass $backend;
}
```

The routing configuration may include a mapping for a virtual IP address 127.128.1.35 of (e.g., allocated to) the host 328 to the Domain1.com, which may be the domain 326-*a*. The routing configuration may also include a mapping for an IP address 10.0.178.124 of the host 358 to the Domain2.com, which may be the domain 326-*b*. The routing configuration may also map the Domain1.com to a server having the address 127.0.0.138:1445 (e.g., the server 320-*a*) and map the Domain2.com to a server having the address server 127.0.0.139:1445 (e.g., the server 320-*b*). Accordingly, in accordance with the routing configuration, the demultiplexer 346 may route a packet having the virtual IP address 127.128.1.35 set as the source IP address to the server 127.0.0.138:1445 and route a packet having the IP address 10.0.178.124 set as the source IP address to the server 127.0.0.139:1445

The routing configuration may also indicate for which interfaces (e.g., IP addresses) the demultiplexer 346 is configured to listen to the port 344. For example, the routing configuration may indicate that the demultiplexer is configured to intercept and route packets communicated via the port having port number 445 (e.g., the port 344) for all public interfaces of the node 315 and for virtual interfaces of the node 315 via which packets are received via the tunnel 342. Virtual interfaces of (e.g., virtual IP addresses allocated to) non-addressable domain controllers may be excluded from the listening configuration. In the example of the routing configuration above, the demultiplexer 346 may be configured to intercept and route packets communicated via port 445 that have the IP addresses 10.0.39.214 and 127.128.2.0, which may correspond to a public interface of the node 315 and a virtual interface (e.g., private interface) of the node 315, respectively. As such, packets having different virtual IP addresses, such as the virtual IP address 354 allocated to the domain controller 330, may not be intercepted by the demultiplexer 346 based on the routing configuration indicating that the demultiplexer 346 is not configured to listen to the port 344 for that virtual interface.

In some examples, the software process 338-*b* may bind the IP address 127.128.2.0 to packets received via the tunnel 342 before (e.g., as part of) forwarding the packet to port 445. In some examples, the virtual IP address allocated to the node 315 as the virtual interface may be allocated statically to avoid conflicts (e.g., allocation of same virtual IP addresses) with virtual IP addresses allocated to hosts 328 and domain controllers 330).

Figure 4:
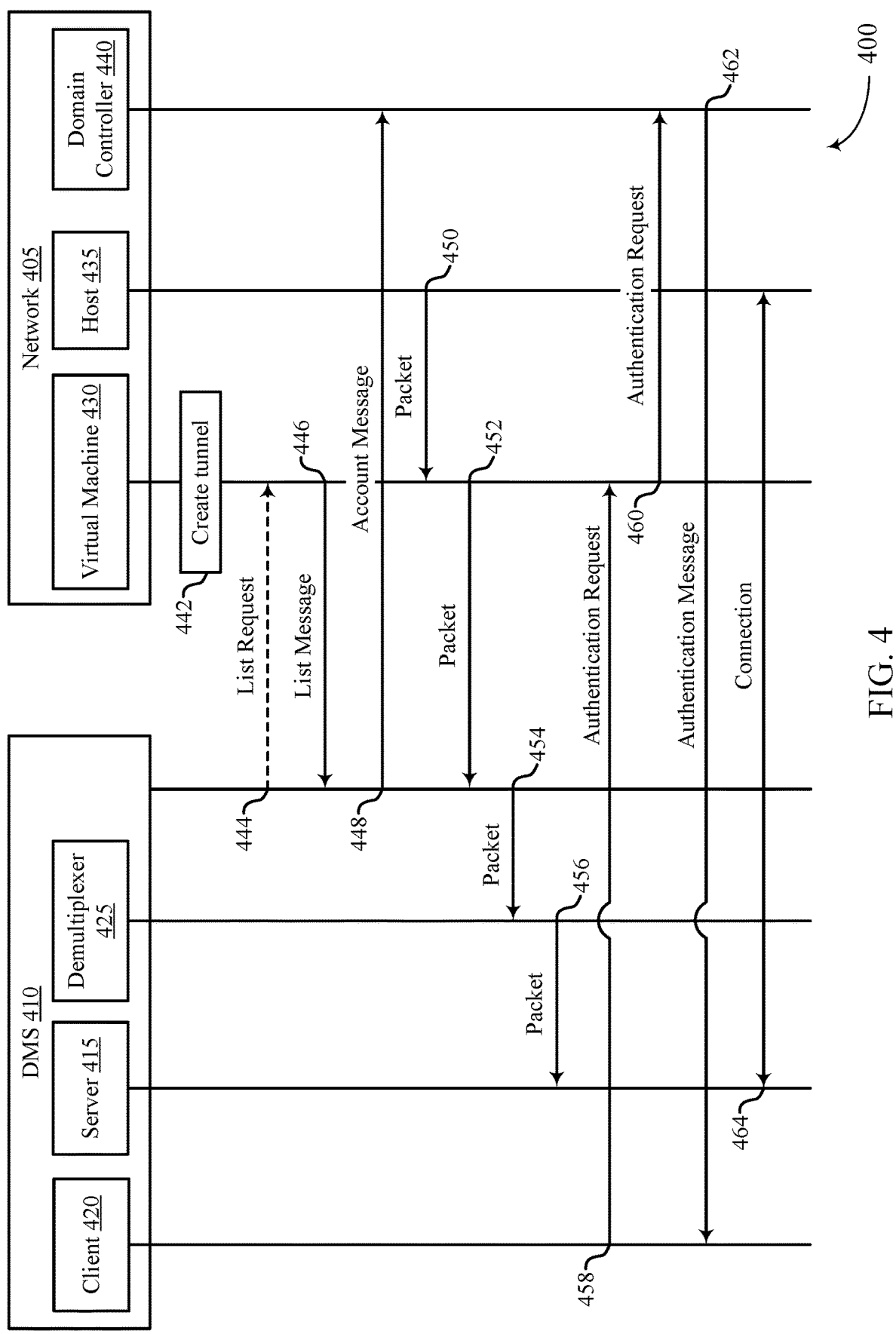
FIG. 4 illustrates an example of a process flow that supports host authentication using a non-addressable domain controller in accordance with aspects of the present disclosure.

FIG. 4 illustrates an example of a process flow 400 that supports host authentication using a non-addressable domain controller in accordance with aspects of the present disclosure. The process flow 400 may implement or be implemented by aspects of the computing environments described with reference to FIGS. 1 through 3. For example, the process flow 400 may be implemented by a network 405 and a DMS 410. The network 405 and the DMS 410 may be examples of the corresponding networks and systems described with reference to FIGS. 1 through 3. The DMS 410 may include a server 415, a client 420, and a demultiplexer 425 (among other components, software entities, or a combination thereof), which may be examples of the corresponding aspects described with reference to FIGS. 2 and 3. The network may include 405 may include a virtual machine 430, a host 435, and a domain controller 440, which may be examples of the corresponding aspects described with reference to FIGS. 2 and 3.

In the following description of the process flow 400, the operations between the network 405 and the DMS 410 may be performed in a different order than the example order shown, or the operations performed by the network 405 and the DMS 410 may be performed in different orders or at different times. Some operations may also be omitted from the process flow 400, and other operations may be added to the process flow 400. Further, although some operations or signaling may be shown to occur at different times for discussion purposes, these operations may actually occur at the same time.

At 442, the virtual machine 430 may create a tunnel (e.g., a tunnel 265 or 342) to support communications between the network 405 and the DMS 410. For example, the tunnel may be a TLS tunnel via which the host 435 may communicate packets with the DMS 410 (e.g., the server 415) and via which the client 420 may communicate packets with the domain controller 440. In some examples, the tunnel may be between the virtual machine 430 and the DMS 410, such as between software processes at the virtual machine 430 and the DMS 410 that support multiplexing and demultiplexing various network data flows (e.g., to corresponding ports).

At 444, the DMS 410 may transmit a list request to the virtual machine 430 via the tunnel. For example, the list request may request for the virtual machine 430 to obtain and transmit a list of one or more domain controllers 440 within the network 405 that are available for access by the DMS 410 (e.g., the client 420).

At 446, the virtual machine 430 may transmit a list message to the DMS 410 via the tunnel that indicates the list of one or more domain controllers 440, including the domain controller 440. In some examples, the virtual machine may transmit the list message in response to the list request. In some examples, the virtual machine 430 may transmit the list message after (e.g., in response to) being instantiated within the network 405, such as without receiving the list request. In some examples, the virtual machine 430 may obtain the list from a DNS server within the network 405 that is not directly reachable by the DMS 410.

At 448, the DMS 410 may create an account (e.g., a machine account) at the domain controller 440 for the DMS 410 such that the DMS 410 may be authorized (e.g., permitted) to request authentication of the host 435 by the domain controller 440. For example, the DMS 410 (e.g., the client 420) may transmit an account message to the domain controller 440 via the tunnel that requests to create the account for the DMS 410 at the domain controller 440. The DMS 410 may transmit the account message such that is bypasses the demultiplexer 425, for example, based on the demultiplexer being configured to not monitor a port via which the account message is transmitted when the DMS 410 is operating in a client mode (e.g., as the client 420, such as the account message being transmitted by the client 420).

At 450, the host 435 may transmit a packet intended for the server 415. For example, the packet may be associated with a request to establish a connection with the server 415. The host 435 may transmit the packet to the virtual machine 430.

At 452, the virtual machine 430 may forward the packet to the DMS 410 via the tunnel. For example, the virtual machine 430 may forward the packet to the software process at the DMS 410.

At 454, the software process at the DMS 410 may forward the packet to the port that may be monitored by the demultiplexer 425. The software process may bind a virtual IP address allocated to the host 435 to the packet as the source IP address of the packet.

At 456, the demultiplexer 425 may route the packet to the server 415. For example, the demultiplexer 425 may intercept the packet forwarded to the port and route the packet to the server 415 in accordance with the virtual IP address allocated to the host 435 and corresponding to the server 415.

At 458, the DMS 410 may initiate an authentication of the host 435. For example, the client 420 may transmit an authentication request intended for the domain controller 440 requesting for the domain controller to authenticate the host 435 (e.g., verify whether the host 435 is authorized to access the server 415). The authentication request may be transmitted via the port to the software process at the DMS 410 and to the virtual machine 430 via the tunnel. The authentication request may bypass the demultiplexer 425 based on the demultiplexer being configured to not monitor the port when DMS 410 is operating in the client mode.

At 460, the virtual machine 430 may forward the authentication request to the domain controller 440, for example, by mapping an identifier associated with the domain controller 440 and included in the authentication request to a private IP address of the domain controller 440.

At 462, the domain controller 440 may transmit an authentication message to the client 420 indicating whether the host 435 is authenticated. The authentication message may be routed via a same path (e.g., but in reverse order) as the authentication request, thus bypassing demultiplexer 425. In the example of FIG. 4, the authentication message may indicate that the host 435 is authenticated.

At 464, the server 415 (e.g., the DMS 410) may establish the connection with the host 435 based on the host 435 being authenticated by the domain controller 440.

Figure 5:
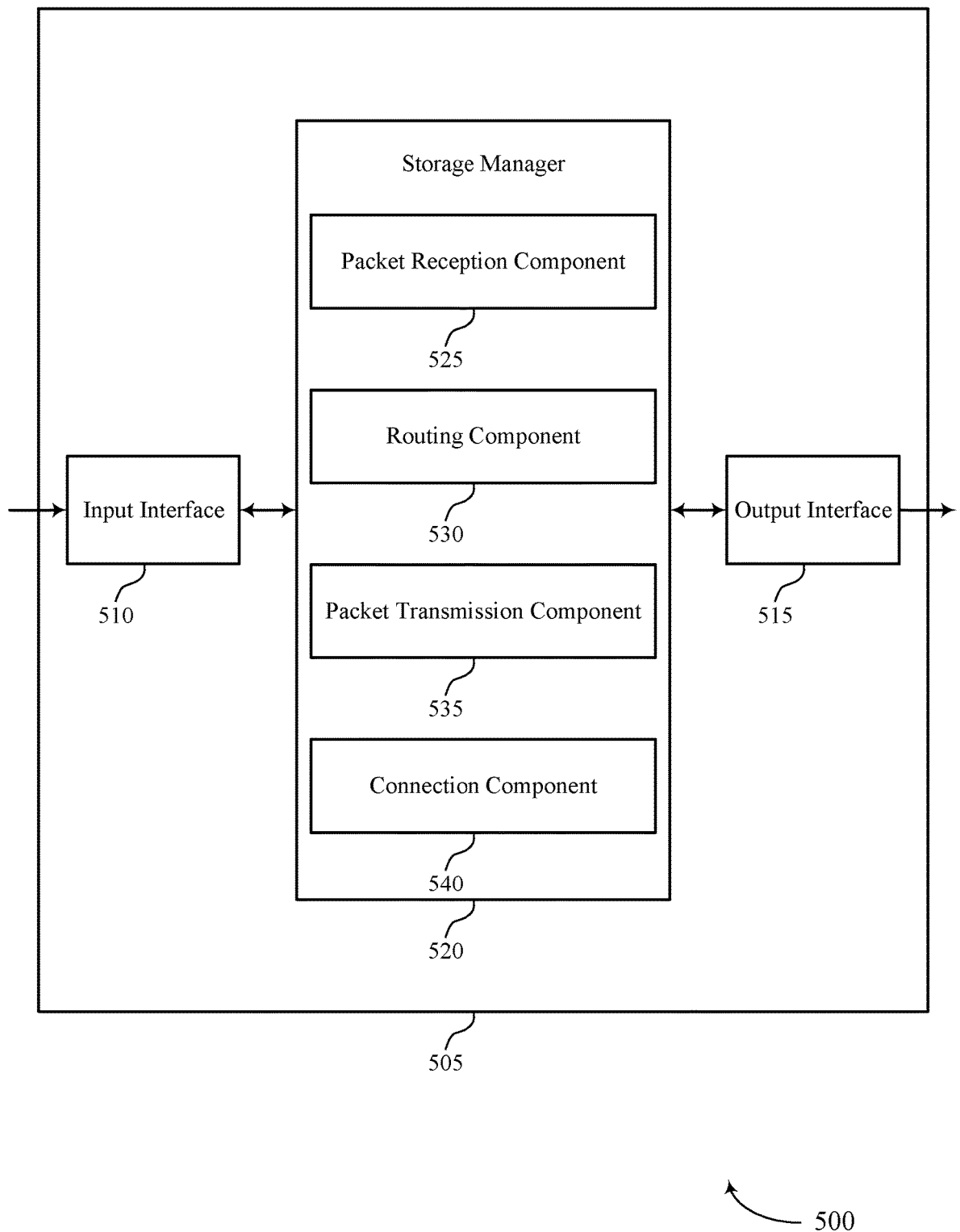
FIG. 5 illustrates a block diagram of an apparatus that supports host authentication using a non-addressable domain controller in accordance with aspects of the present disclosure.

FIG. 5 illustrates a block diagram 500 of a system 505 that supports host authentication using a non-addressable domain controller in accordance with aspects of the present disclosure. In some examples, the system 505 may be an example of aspects of one or more components described with reference to FIGS. 1 through, such as a DMS 110, 210, 310, or 410. The system 505 may include an input interface 510, an output interface 515, and a storage manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the storage manager 520 to support host authentication using a non-addressable domain controller. In some cases, the input interface 510 may be a component of a network interface 725 as described with reference to FIG. 7.

The output interface 515 may manage output signaling for the system 505. For example, the output interface 515 may receive signaling from other components of the system 505, such as the storage manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the storage manager 520 may include a packet reception component 525, a routing component 530, a packet transmission component 535, a connection component 540, or any combination thereof. In some examples, the storage manager 520, or various components thereof, may be configured to perform various operations (e.g., receiving, monitoring, transmitting) using or otherwise in cooperation with the input interface 510, the output interface 515, or both. For example, the storage manager 520 may receive information from the input interface 510, send information to the output interface 515, or be integrated in combination with the input interface 510, the output interface 515, or both to receive information, transmit information, or perform various other operations as described herein.

The storage manager 520 may support data management in accordance with examples as disclosed herein. The packet reception component 525 may be configured as or otherwise support a means for receiving a first packet at a DMS (e.g., the system 505), where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host. The routing component 530) may be configured as or otherwise support a means for routing the first packet to the storage entity using a demultiplexer of the DMS that is configured to monitor the port when the storage entity operates to receive packets in a server mode via the port, the demultiplexer configured to identify the storage entity based on an IP address associated with the host. The packet transmission component 535 may be configured as or otherwise support a means for transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port. The packet reception component 525 may be configured as or otherwise support a means for receiving, at the storage entity from the domain controller, a third packet that indicates an authentication of the host, where the third packet bypasses the demultiplexer based on being in response to the second packet. The connection component 540 may be configured as or otherwise support a means for establishing the connection between the storage entity and the host based on the authentication of the host indicated by the third packet.

Figure 6:
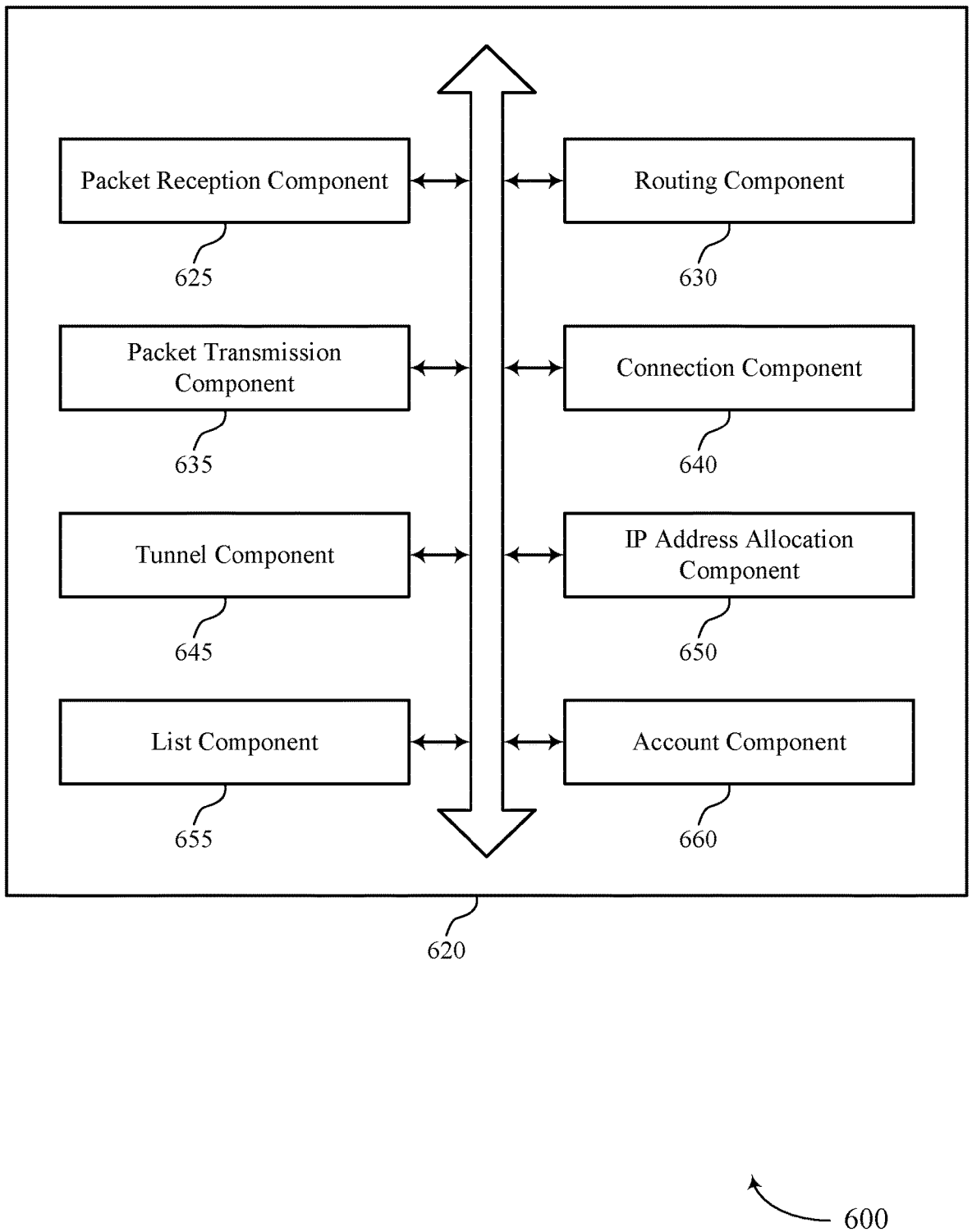
FIG. 6 illustrates a block diagram of a storage manager that supports host authentication using a non-addressable domain controller in accordance with aspects of the present disclosure.

FIG. 6 illustrates a block diagram 600 of a storage manager 620) that supports host authentication using a non-addressable domain controller in accordance with aspects of the present disclosure. The storage manager 620 may be an example of aspects of a storage manager or a storage manager 520, or both, as described herein. The storage manager 620, or various components thereof, may be an example of means for performing various aspects of host authentication using a non-addressable domain controller as described herein. For example, the storage manager 620 may include a packet reception component 625, a routing component 630, a packet transmission component 635, a connection component 640, a tunnel component 645, an IP address allocation component 650, a list component 655, an account component 660, or any combination thereof. Each of these components may communicate, directly or indirectly, with one another (e.g., via one or more buses, communications links, communications interfaces, or any combination thereof).

The storage manager 620 may support data management in accordance with examples as disclosed herein. The packet reception component 625 may be configured as or otherwise support a means for receiving a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host. The routing component 630) may be configured as or otherwise support a means for routing the first packet to the storage entity using a demultiplexer of the DMS that is configured to monitor the port when the storage entity operates to receive packets in a server mode via the port, the demultiplexer configured to identify the storage entity based on an IP address associated with the host. The packet transmission component 635 may be configured as or otherwise support a means for transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port. In some examples, the packet reception component 625 may be configured as or otherwise support a means for receiving, at the storage entity from the domain controller, a third packet that indicates an authentication of the host, where the third packet bypasses the demultiplexer based on being in response to the second packet. The connection component 640 may be configured as or otherwise support a means for establishing the connection between the storage entity and the host based on the authentication of the host indicated by the third packet.

In some examples, the tunnel component 645 may be configured as or otherwise support a means for instantiating, within the network, a virtual machine configured to create a tunnel for communications between the DMS and the one or more hosts. In some examples, the routing component 630 may be configured as or otherwise support a means for configuring the demultiplexer not to monitor the port when the storage entity operates to transmit packets in the client mode based on the packets being transmitted via the tunnel.

In some examples, the IP address allocation component 650 may be configured as or otherwise support a means for allocating a virtual IP address to the domain controller, the virtual IP address different than a private IP address of the domain controller, where the second packet is transmitted to the domain controller using the virtual IP address.

In some examples, the tunnel component 645 may be configured as or otherwise support a means for instantiating, within the network, a virtual machine configured to create a tunnel for communications between the DMS and the one or more hosts. In some examples, the list component 655 may be configured as or otherwise support a means for obtaining, via the virtual machine, a list of one or more domain controllers within the network, where the one or more listed domain controllers are associated with authenticating the one or more hosts. In some examples, the account component 660 may be configured as or otherwise support a means for creating, before transmitting the second packet, an account for the DMS at the domain controller based on the domain controller being included in the one or more listed domain controllers, where the third packet is received from the domain controller based on the account created at the domain controller.

In some examples, the list component 655 may be configured as or otherwise support a means for transmitting, to the virtual machine, a fourth packet requesting the list of one or more domain controllers, where the list of one or more domain controllers is obtained via the virtual machine in response to the fourth packet.

In some examples, the list component 655 may be configured as or otherwise support a means for maintaining, via the virtual machine, an up-to-date list of the one or more domain controllers within the network.

In some examples, the list component 655 may be configured as or otherwise support a means for refraining from accessing a DNS server within the network to obtain the list of one or more domain controllers, the refraining based on obtaining the list of one or more domain controllers via the virtual machine.

In some examples, the domain controller is associated with an IP address that, based on the domain controller being within the network, is unknown to the DMS prior to the list of one or more domain controllers being obtained. In some examples, the IP address associated with the domain controller is not directly reachable by the DMS. In some examples, the second packet is transmitted to the domain controller based on obtaining the list of one or more domain controllers.

In some examples, the storage entity operating to transmit packets in the client mode includes the storage entity transmitting packets to request to establish a respective connection between the storage entity and a respective entity within the network.

In some examples, the storage entity operating to receive packets in the server mode includes the storage entity receiving packets to request to establish a respective connection between the storage entity and a respective entity within the network.

Figure 7:
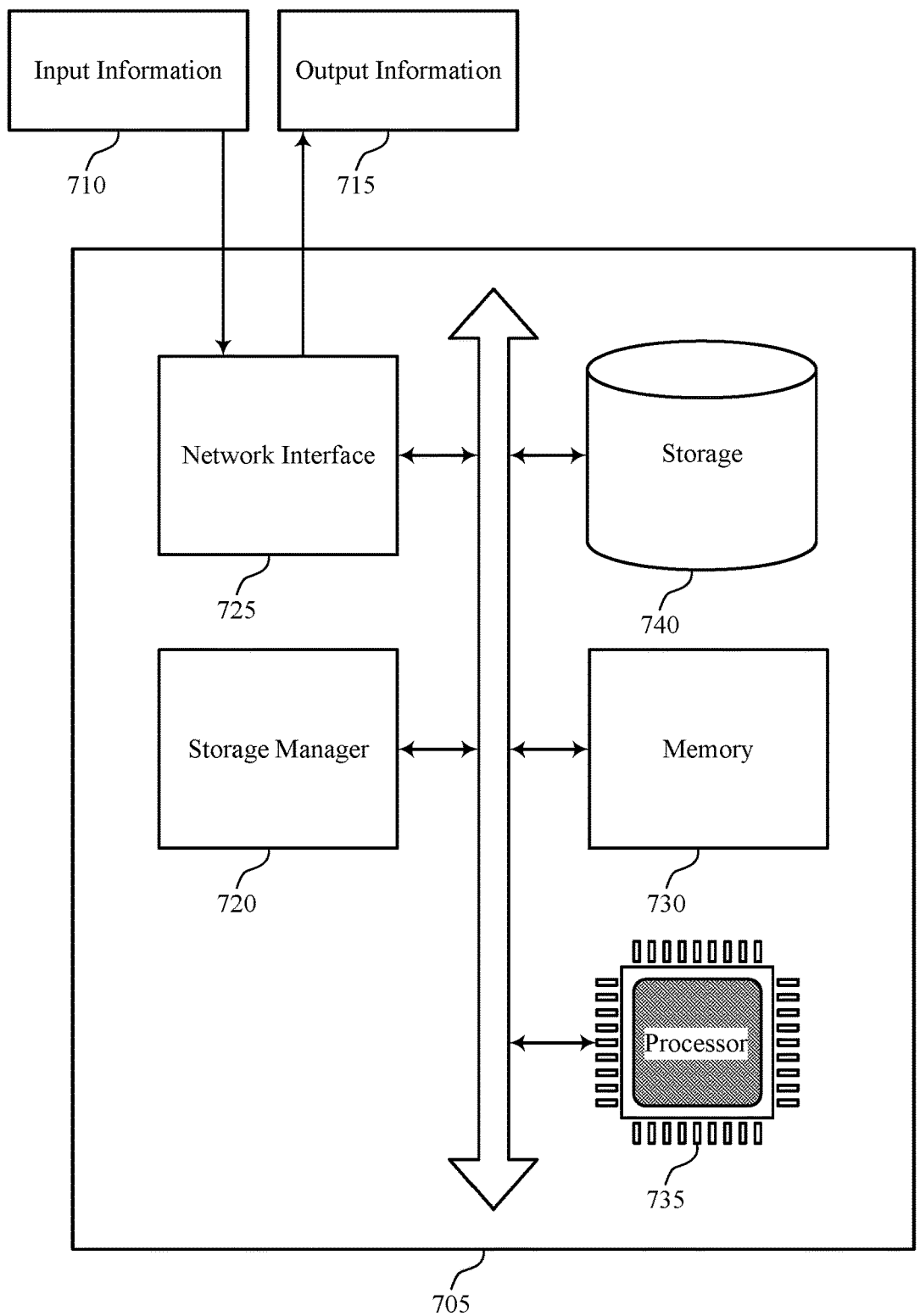
FIG. 7 illustrates a diagram of a system including a device that supports host authentication using a non-addressable domain controller in accordance with aspects of the present disclosure.

FIG. 7 illustrates a block diagram 700 of a system 705 that supports host authentication using a non-addressable domain controller in accordance with aspects of the present disclosure. The system 705 may be an example of or include the components of a system 505 as described herein. The system 705 may include components for data management, including components such as a storage manager 720, an input information 710, an output information 715, a network interface 725, a memory 730, a processor 735, and a storage 740. These components may be in electronic communication or otherwise coupled with each other (e.g., operatively, communicatively, functionally, electronically, electrically: via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIGS. 1 through 4, such as a DMS 110, 210, 310, or 410.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730) may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting host authentication using a non-addressable domain controller). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740) may be configured to store data that is generated, processed, stored, or otherwise used by the system 705. In some cases, the storage 740) may include one or more HDDs, one or more SDDs, or both. In some examples, the storage 740) may be an example of a single database, a distributed database, multiple distributed databases, a data store, a data lake, or an emergency backup database. In some examples, the storage 740 may be an example of one or more components described with reference to FIG. 1, such as one or more network disks 180.

The storage manager 720 may support data management in accordance with examples as disclosed herein. For example, the storage manager 720) may be configured as or otherwise support a means for receiving a first packet at a DMS (e.g., the system 705), where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host. The storage manager 720 may be configured as or otherwise support a means for routing the first packet to the storage entity using a demultiplexer of the DMS that is configured to monitor the port when the storage entity operates to receive packets in a server mode via the port, the demultiplexer configured to identify the storage entity based on an IP address associated with the host. The storage manager 720 may be configured as or otherwise support a means for transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port. The storage manager 720 may be configured as or otherwise support a means for receiving, at the storage entity from the domain controller, a third packet that indicates an authentication of the host, where the third packet bypasses the demultiplexer based on being in response to the second packet. The storage manager 720 may be configured as or otherwise support a means for establishing the connection between the storage entity and the host based on the authentication of the host indicated by the third packet.

By including or configuring the storage manager 720 in accordance with examples as described herein, the system 705 may support techniques for host authentication using a non-addressable domain controller, which may provide one or more benefits such as, for example, backup and recovery services for non-addressable hosts, authentication of non-addressable hosts, increased security of backup and recovery services by supporting the authentication of non-addressable hosts, and backup and recovery services for additional types of network configurations (e.g., networks including non-addressable hosts and domain controllers), among other possibilities.

Figure 8:
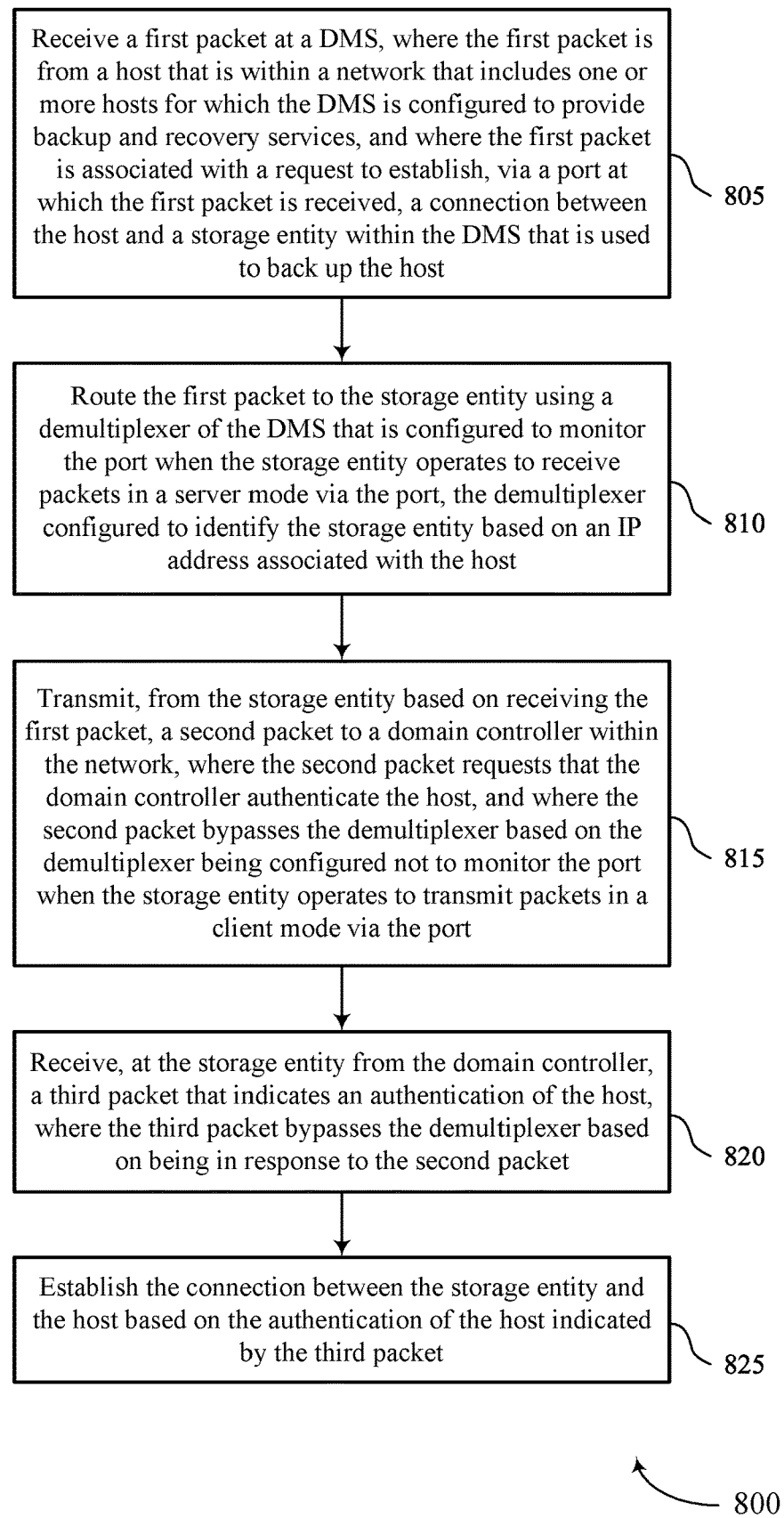
FIGS. 8 through 10 illustrate flowcharts showing methods that support host authentication using a non-addressable domain controller in accordance with aspects of the present disclosure.

FIG. 8 illustrates a flowchart showing a method 800 that supports host authentication using a non-addressable domain controller in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host. The operations of 805 may be performed in accordance with examples as disclosed herein. In some examples, aspects of the operations of 805 may be performed by a packet reception component 625 as described with reference to FIG. 6.

At 810, the method may include routing the first packet to the storage entity using a demultiplexer of the DMS that is configured to monitor the port when the storage entity operates to receive packets in a server mode via the port, the demultiplexer configured to identify the storage entity based on an IP address associated with the host. The operations of 810 may be performed in accordance with examples as disclosed herein. In some examples, aspects of the operations of 810 may be performed by a routing component 630 as described with reference to FIG. 6.

At 815, the method may include transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port. The operations of 815 may be performed in accordance with examples as disclosed herein. In some examples, aspects of the operations of 815 may be performed by a packet transmission component 635 as described with reference to FIG. 6.

At 820, the method may include receiving, at the storage entity from the domain controller, a third packet that indicates an authentication of the host, where the third packet bypasses the demultiplexer based on being in response to the second packet. The operations of 820 may be performed in accordance with examples as disclosed herein. In some examples, aspects of the operations of 820 may be performed by a packet reception component 625 as described with reference to FIG. 6.

At 825, the method may include establishing the connection between the storage entity and the host based on the authentication of the host indicated by the third packet. The operations of 825 may be performed in accordance with examples as disclosed herein. In some examples, aspects of the operations of 825 may be performed by a connection component 640 as described with reference to FIG. 6.

Figure 9:
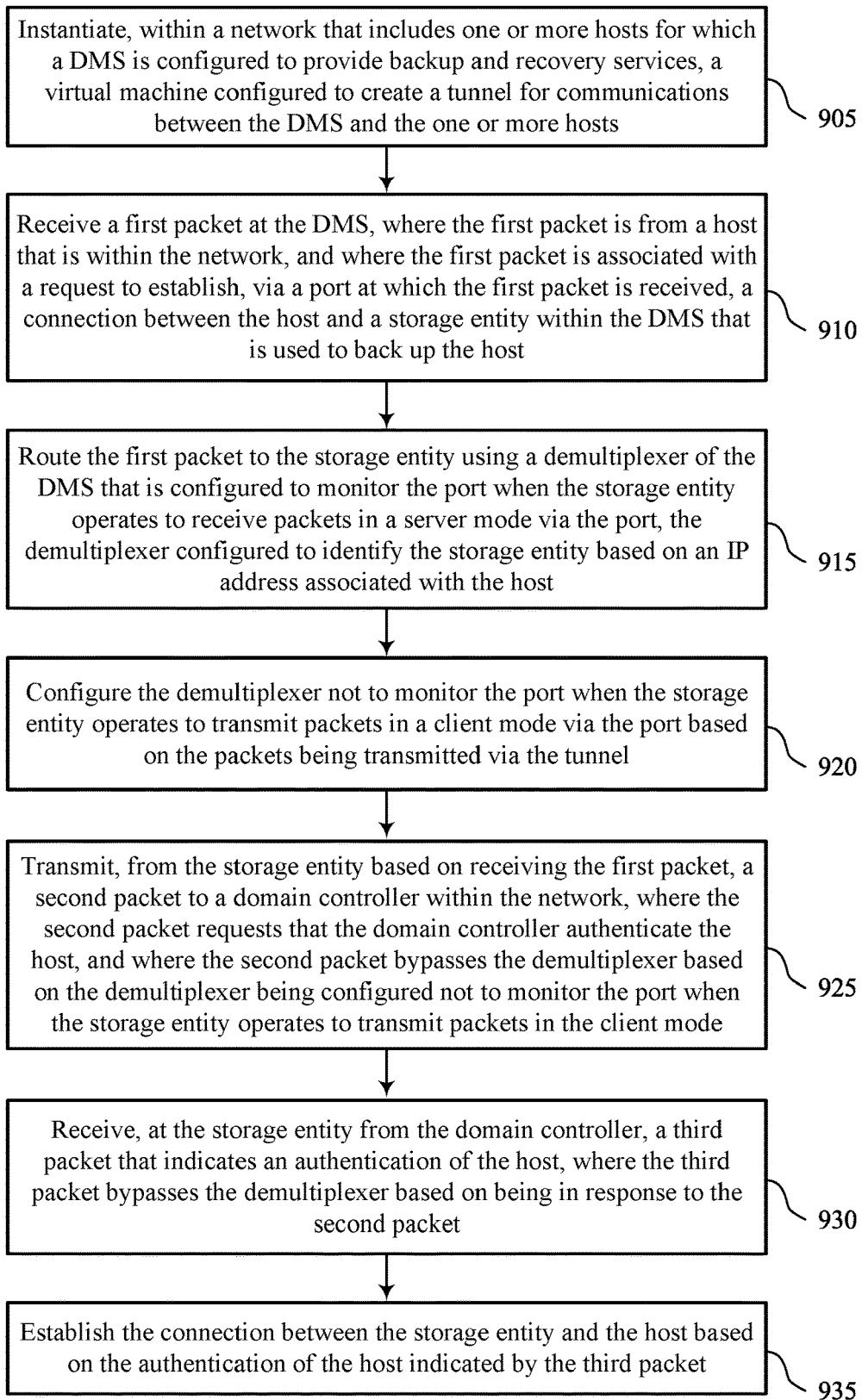

FIG. 9 illustrates a flowchart showing a method 900 that supports host authentication using a non-addressable domain controller in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include instantiating, within a network that includes one or more hosts for which a DMS is configured to provide backup and recovery services, a virtual machine configured to create a tunnel for communications between the DMS and the one or more hosts. The operations of 905 may be performed in accordance with examples as disclosed herein. In some examples, aspects of the operations of 905 may be performed by a tunnel component 645 as described with reference to FIG. 6.

At 910, the method may include receiving a first packet at the DMS, where the first packet is from a host that is within the network, and where the first packet is associated with a request to establish, via a port at which the first packet is received, a connection between the host and a storage entity within the DMS that is used to back up the host. The operations of 910 may be performed in accordance with examples as disclosed herein. In some examples, aspects of the operations of 910 may be performed by a packet reception component 625 as described with reference to FIG. 6.

At 915, the method may include routing the first packet to the storage entity using a demultiplexer of the DMS that is configured to monitor the port when the storage entity operates to receive packets in a server mode via the port, the demultiplexer configured to identify the storage entity based on an IP address associated with the host. The operations of 915 may be performed in accordance with examples as disclosed herein. In some examples, aspects of the operations of 915 may be performed by a routing component 630 as described with reference to FIG. 6.

At 920, the method may include configuring the demultiplexer not to monitor the port when the storage entity operates to transmit packets in a client mode via the port based on the packets being transmitted via the tunnel. The operations of 920 may be performed in accordance with examples as disclosed herein. In some examples, aspects of the operations of 920 may be performed by a routing component 630 as described with reference to FIG. 6.

At 925, the method may include transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in the client mode. The operations of 925 may be performed in accordance with examples as disclosed herein. In some examples, aspects of the operations of 925 may be performed by a packet transmission component 635 as described with reference to FIG. 6.

At 930, the method may include receiving, at the storage entity from the domain controller, a third packet that indicates an authentication of the host, where the third packet bypasses the demultiplexer based on being in response to the second packet. The operations of 930 may be performed in accordance with examples as disclosed herein. In some examples, aspects of the operations of 930 may be performed by a packet reception component 625 as described with reference to FIG. 6.

At 935, the method may include establishing the connection between the storage entity and the host based on the authentication of the host indicated by the third packet. The operations of 935 may be performed in accordance with examples as disclosed herein. In some examples, aspects of the operations of 935 may be performed by a connection component 640) as described with reference to FIG. 6.

Figure 10:
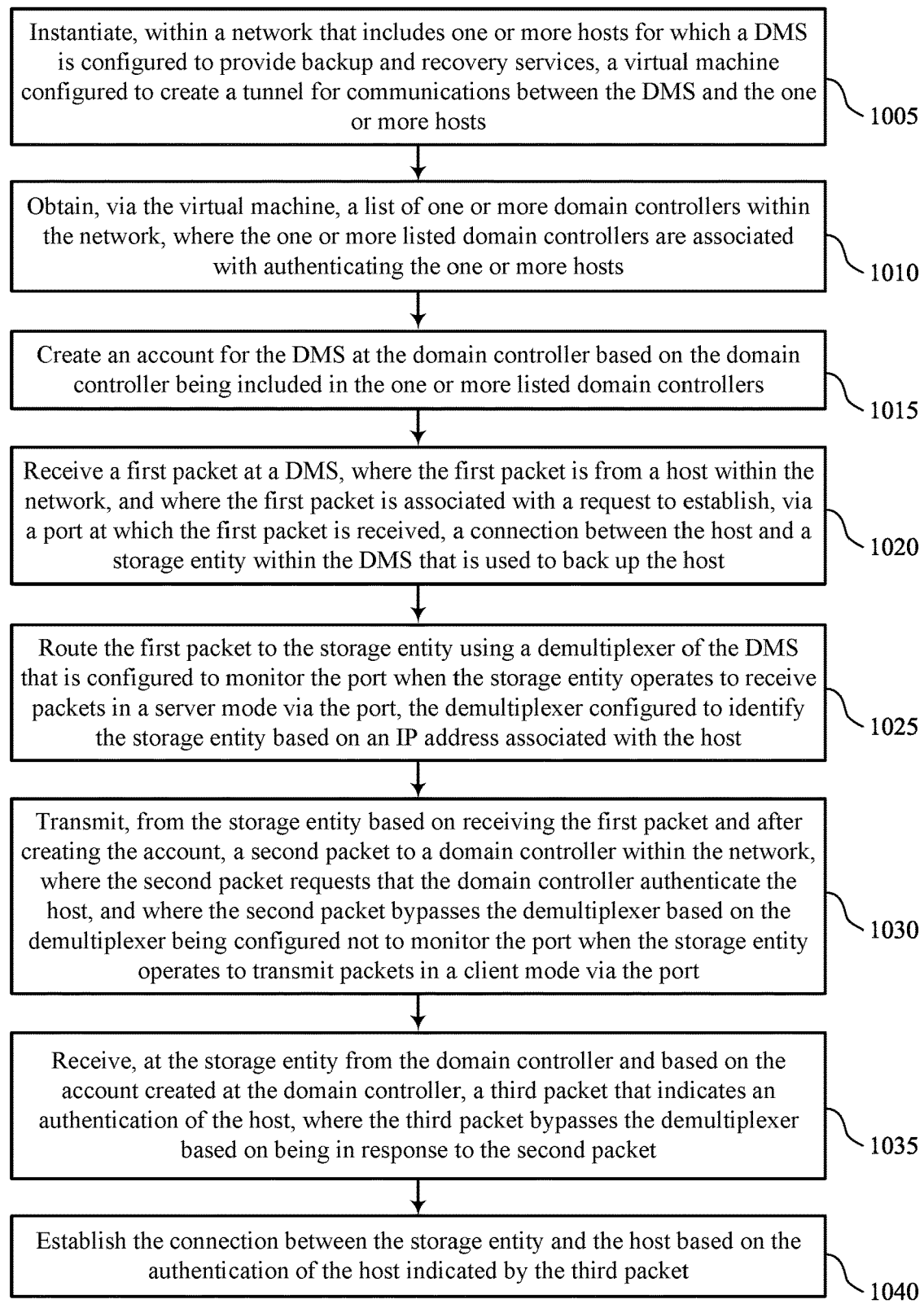

FIG. 10 illustrates a flowchart showing a method 1000 that supports host authentication using a non-addressable domain controller in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include instantiating, within a network that includes one or more hosts for which a DMS is configured to provide backup and recovery services, a virtual machine configured to create a tunnel for communications between the DMS and the one or more hosts. The operations of 1005 may be performed in accordance with examples as disclosed herein. In some examples, aspects of the operations of 1005 may be performed by a tunnel component 645 as described with reference to FIG. 6.

At 1010, the method may include obtaining, via the virtual machine, a list of one or more domain controllers within the network, where the one or more listed domain controllers are associated with authenticating the one or more hosts. The operations of 1010 may be performed in accordance with examples as disclosed herein. In some examples, aspects of the operations of 1010 may be performed by a list component 655 as described with reference to FIG. 6.

At 1015, the method may include creating, an account for the DMS at the domain controller based on the domain controller being included in the one or more listed domain controllers. The operations of 1015 may be performed in accordance with examples as disclosed herein. In some examples, aspects of the operations of 1015 may be performed by an account component 660 as described with reference to FIG. 6.

At 1020, the method may include receiving a first packet at a DMS, where the first packet is from a host within the network, and where the first packet is associated with a request to establish, via a port at which the first packet is received, a connection between the host and a storage entity within the DMS that is used to back up the host. The operations of 1020 may be performed in accordance with examples as disclosed herein. In some examples, aspects of the operations of 1020 may be performed by a packet reception component 625 as described with reference to FIG. 6.

At 1025, the method may include routing the first packet to the storage entity using a demultiplexer of the DMS that is configured to monitor the port when the storage entity operates to receive packets in a server mode via the port, the demultiplexer configured to identify the storage entity based on an IP address associated with the host. The operations of 1025 may be performed in accordance with examples as disclosed herein. In some examples, aspects of the operations of 1025 may be performed by a routing component 630 as described with reference to FIG. 6.

At 1030, the method may include transmitting, from the storage entity based on receiving the first packet and after creating the account, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port. The operations of 1030 may be performed in accordance with examples as disclosed herein. In some examples, aspects of the operations of 1030 may be performed by a packet transmission component 635 as described with reference to FIG. 6.

At 1035, the method may include receiving, at the storage entity from the domain controller and based on the account created at the domain controller, a third packet that indicates an authentication of the host, where the third packet bypasses the demultiplexer based on being in response to the second packet. The operations of 1035 may be performed in accordance with examples as disclosed herein. In some examples, aspects of the operations of 1035 may be performed by a packet reception component 625 as described with reference to FIG. 6.

At 1040, the method may include establishing the connection between the storage entity and the host based on the authentication of the host indicated by the third packet. The operations of 1040 may be performed in accordance with examples as disclosed herein. In some examples, aspects of the operations of 1040 may be performed by a connection component 640) as described with reference to FIG. 6.

A method for data management is described. The method may include receiving a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host, routing the first packet to the storage entity using a demultiplexer of the DMS that is configured to monitor the port when the storage entity operates to receive packets in a server mode via the port, the demultiplexer configured to identify the storage entity based on an IP address associated with the host, transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port, receiving, at the storage entity from the domain controller, a third packet that indicates an authentication of the host, where the third packet bypasses the demultiplexer based on being in response to the second packet, and establishing the connection between the storage entity and the host based on the authentication of the host indicated by the third packet.

An apparatus for data management is described. The apparatus may include at least one processor, memory coupled with the at least one processor, and instructions stored in the memory. The instructions may be executable by the at least one processor to cause the apparatus to receive a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host, route the first packet to the storage entity using a demultiplexer of the DMS that is configured to monitor the port when the storage entity operates to receive packets in a server mode via the port, the demultiplexer configured to identify the storage entity based on an IP address associated with the host, transmit, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port, receive, at the storage entity from the domain controller, a third packet that indicates an authentication of the host, where the third packet bypasses the demultiplexer based on being in response to the second packet, and establish the connection between the storage entity and the host based on the authentication of the host indicated by the third packet.

Another apparatus for data management is described. The apparatus may include means for receiving a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host, means for routing the first packet to the storage entity using a demultiplexer of the DMS that is configured to monitor the port when the storage entity operates to receive packets in a server mode via the port, the demultiplexer configured to identify the storage entity based on an IP address associated with the host, means for transmitting, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port, means for receiving, at the storage entity from the domain controller, a third packet that indicates an authentication of the host, where the third packet bypasses the demultiplexer based on being in response to the second packet, and means for establishing the connection between the storage entity and the host based on the authentication of the host indicated by the third packet.

A non-transitory computer-readable medium storing code for data management is described. The code may include instructions executable by at least one processor to receive a first packet at a DMS, where the first packet is from a host that is within a network that includes one or more hosts for which the DMS is configured to provide backup and recovery services, and where the first packet is associated with a request to establish, via a port at which the first packet is received, a connection between the host and a storage entity within the DMS that is used to back up the host, route the first packet to the storage entity using a demultiplexer of the DMS that is configured to monitor the port when the storage entity operates to receive packets in a server mode via the port, the demultiplexer configured to identify the storage entity based on an IP address associated with the host, transmit, from the storage entity based on receiving the first packet, a second packet to a domain controller within the network, where the second packet requests that the domain controller authenticate the host, and where the second packet bypasses the demultiplexer based on the demultiplexer being configured not to monitor the port when the storage entity operates to transmit packets in a client mode via the port, receive, at the storage entity from the domain controller, a third packet that indicates an authentication of the host, where the third packet bypasses the demultiplexer based on being in response to the second packet, and establish the connection between the storage entity and the host based on the authentication of the host indicated by the third packet.

Some examples of the method, apparatuses, and non-transitory computer-readable medium described herein may further include operations, features, means, or instructions for instantiating, within the network, a virtual machine configured to create a tunnel for communications between the DMS and the one or more hosts and configuring the demultiplexer not to monitor the port when the storage entity operates to transmit packets in the client mode based on the packets being transmitted via the tunnel.

Some examples of the method, apparatuses, and non-transitory computer-readable medium described herein may further include operations, features, means, or instructions for allocating a virtual IP address to the domain controller, the virtual IP address different than a private IP address of the domain controller, where the second packet may be transmitted to the domain controller using the virtual IP address.

Some examples of the method, apparatuses, and non-transitory computer-readable medium described herein may further include operations, features, means, or instructions for instantiating, within the network, a virtual machine configured to create a tunnel for communications between the DMS and the one or more hosts, obtaining, via the virtual machine, a list of one or more domain controllers within the network, where the one or more listed domain controllers may be associated with authenticating the one or more hosts, and creating, before transmitting the second packet, an account for the DMS at the domain controller based on the domain controller being included in the one or more listed domain controllers, where the third packet may be received from the domain controller based on the account created at the domain controller.

Some examples of the method, apparatuses, and non-transitory computer-readable medium described herein may further include operations, features, means, or instructions for transmitting, to the virtual machine, a fourth packet requesting the list of one or more domain controllers, where the list of one or more domain controllers may be obtained via the virtual machine in response to the fourth packet.

Some examples of the method, apparatuses, and non-transitory computer-readable medium described herein may further include operations, features, means, or instructions for maintaining, via the virtual machine, an up-to-date list of the one or more domain controllers within the network.

Some examples of the method, apparatuses, and non-transitory computer-readable medium described herein may further include operations, features, means, or instructions for refraining from accessing a DNS server within the network to obtain the list of one or more domain controllers, the refraining based on obtaining the list of one or more domain controllers via the virtual machine.

In some examples of the method, apparatuses, and non-transitory computer-readable medium described herein, the domain controller may be associated with an IP address that, based on the domain controller being within the network, may be unknown to the DMS prior to the list of one or more domain controllers being obtained and the second packet may be transmitted to the domain controller based on obtaining the list of one or more domain controllers. In some examples of the method, apparatuses, and non-transitory computer-readable medium described herein, the IP address associated with the domain controller may not be directly reachable by the DMS.

In some examples of the method, apparatuses, and non-transitory computer-readable medium described herein, the storage entity operating to transmit packets in the client mode includes the storage entity transmitting packets to request to establish a respective connection between the storage entity and a respective entity within the network.

In some examples of the method, apparatuses, and non-transitory computer-readable medium described herein, the storage entity operating to receive packets in the server mode includes the storage entity receiving packets to request to establish a respective connection between the storage entity and a respective entity within the network.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
receiving a first packet at a data management system, wherein the first packet is from a host that is within a network that includes one or more hosts for which the data management system is configured to provide backup and recovery services, and wherein the first packet is associated with a request to establish, via a port at which the first packet is received, a connection between the host and a storage entity within the data management system that is used to back up the host;
routing the first packet to the storage entity using a demultiplexer of the data management system that is configured to monitor the port when the storage entity operates to receive packets in a server mode via the port, the demultiplexer configured to identify the storage entity based at least in part on an internet protocol address associated with the host;
transmitting, from the storage entity based at least in part on receiving the first packet, a second packet to a domain controller within the network, wherein the second packet requests that the domain controller authenticate the host, and wherein the second packet bypasses the demultiplexer based at least in part on the demultiplexer being configured not to monitor the port when the storage entity operates to transmit packets in a client mode via the port;
receiving, at the storage entity from the domain controller, a third packet that indicates an authentication of the host, wherein the third packet bypasses the demultiplexer based at least in part on being in response to the second packet; and
establishing the connection between the storage entity and the host based at least in part on the authentication of the host indicated by the third packet.

2. The method of claim 1, further comprising:
instantiating, within the network, a virtual machine configured to create a tunnel for communications between the data management system and the one or more hosts; and
configuring the demultiplexer not to monitor the port when the storage entity operates to transmit packets in the client mode based at least in part on the packets being transmitted via the tunnel.

3. The method of claim 1, further comprising:
allocating a virtual internet protocol address to the domain controller, the virtual internet protocol address different than a private internet protocol address of the domain controller, wherein the second packet is transmitted to the domain controller using the virtual internet protocol address.

4. The method of claim 1, further comprising:
instantiating, within the network, a virtual machine configured to create a tunnel for communications between the data management system and the one or more hosts;
obtaining, via the virtual machine, a list of one or more domain controllers within the network, wherein the one or more listed domain controllers are associated with authenticating the one or more hosts; and
creating, before transmitting the second packet, an account for the data management system at the domain controller based at least in part on the domain controller being included in the one or more listed domain controllers, wherein the third packet is received from the domain controller based at least in part on the account created at the domain controller.

5. The method of claim 4, further comprising:
transmitting, to the virtual machine, a fourth packet requesting the list of one or more domain controllers, wherein the list of one or more domain controllers is obtained via the virtual machine in response to the fourth packet.

6. The method of claim 4, further comprising:
maintaining, via the virtual machine, an up-to-date list of the one or more domain controllers within the network.

7. The method of claim 4, further comprising:
refraining from accessing a domain name system (DNS) server within the network to obtain the list of one or more domain controllers, the refraining based at least in part on obtaining the list of one or more domain controllers via the virtual machine.

8. The method of claim 4, wherein:
the domain controller is associated with an internet protocol address that, based at least in part on the domain controller being within the network, is unknown to the data management system prior to the list of one or more domain controllers being obtained, and
the second packet is transmitted to the domain controller based at least in part on obtaining the list of one or more domain controllers.

9. The method of claim 1, wherein the storage entity operating to transmit packets in the client mode comprises the storage entity transmitting packets to request to establish a respective connection between the storage entity and a respective entity within the network.

10. The method of claim 1, wherein the storage entity operating to receive packets in the server mode comprises the storage entity receiving packets to request to establish a respective connection between the storage entity and a respective entity within the network.

11. An apparatus for data management, comprising:
at least one processor;
memory coupled with the at least one processor; and
instructions stored in the memory and executable by the at least one processor to cause the apparatus to:
receive a first packet at a data management system, wherein the first packet is from a host that is within a network that includes one or more hosts for which the data management system is configured to provide backup and recovery services, and wherein the first packet is associated with a request to establish, via a port at which the first packet is received, a connection between the host and a storage entity within the data management system that is used to back up the host;
route the first packet to the storage entity using a demultiplexer of the data management system that is configured to monitor the port when the storage entity operates to receive packets in a server mode via the port, the demultiplexer configured to identify the storage entity based at least in part on an internet protocol address associated with the host;
transmit, from the storage entity based at least in part on receiving the first packet, a second packet to a domain controller within the network, wherein the second packet requests that the domain controller authenticate the host, and wherein the second packet bypasses the demultiplexer based at least in part on the demultiplexer being configured not to monitor the port when the storage entity operates to transmit packets in a client mode via the port;

receive, at the storage entity from the domain controller, a third packet that indicates an authentication of the host, wherein the third packet bypasses the demultiplexer based at least in part on being in response to the second packet; and establish the connection between the storage entity and the host based at least in part on the authentication of the host indicated by the third packet.

12. The apparatus of claim 11, wherein the instructions are further executable by the at least one processor to cause the apparatus to:

instantiate, within the network, a virtual machine configured to create a tunnel for communications between the data management system and the one or more hosts; and configure the demultiplexer not to monitor the port when the storage entity operates to transmit packets in the client mode based at least in part on the packets being transmitted via the tunnel.

13. The apparatus of claim 11, wherein the instructions are further executable by the at least one processor to cause the apparatus to:

allocate a virtual internet protocol address to the domain controller, the virtual internet protocol address different than a private internet protocol address of the domain controller, wherein the second packet is transmitted to the domain controller using the virtual internet protocol address.

14. The apparatus of claim 11, wherein the instructions are further executable by the at least one processor to cause the apparatus to:

instantiate, within the network, a virtual machine configured to create a tunnel for communications between the data management system and the one or more hosts;

obtain, via the virtual machine, a list of one or more domain controllers within the network, wherein the one or more listed domain controllers are associated with authenticating the one or more hosts; and create, before transmitting the second packet, an account for the data management system at the domain controller based at least in part on the domain controller being included in the one or more listed domain controllers, wherein the instructions are executable by the at least one processor to cause the apparatus to receive the third packet from the domain controller based at least in part on the account created at the domain controller.

15. The apparatus of claim 14, wherein the instructions are further executable by the at least one processor to cause the apparatus to:

transmit, to the virtual machine, a fourth packet requesting the list of one or more domain controllers, wherein the list of one or more domain controllers is obtained via the virtual machine in response to the fourth packet.

16. The apparatus of claim 14, wherein the instructions are further executable by the at least one processor to cause the apparatus to:

maintain, via the virtual machine, an up-to-date list of the one or more domain controllers within the network.

17. The apparatus of claim 14, wherein the instructions are further executable by the at least one processor to cause the apparatus to:

refrain from accessing a domain name system (DNS) server within the network to obtain the list of one or more domain controllers, the refraining based at least in part on obtaining the list of one or more domain controllers via the virtual machine.

18. The apparatus of claim 14, wherein:

the domain controller is associated with an internet protocol address that, based at least in part on the domain controller being within the network, is unknown to the data management system prior to the list of one or more domain controllers being obtained, and instructions are executable by the at least one processor to cause the apparatus to transmit the second packet to the domain controller based at least in part on obtaining the list of one or more domain controllers.

19. The apparatus of claim 11, wherein:

to operate transmit packets in the client mode, the storage entity is operable to transmit packets to request to establish a respective connection between the storage entity and a respective entity within the network, and to operate to receive packets in the server mode, the storage entity is operable to receive packets to request to establish the respective connection between the storage entity and the respective entity within the network.

20. A non-transitory computer-readable medium storing code for data management, the code comprising instructions executable by at least one processor to:

receive a first packet at a data management system, wherein the first packet is from a host that is within a network that includes one or more hosts for which the data management system is configured to provide backup and recovery services, and wherein the first packet is associated with a request to establish, via a port at which the first packet is received, a connection between the host and a storage entity within the data management system that is used to back up the host;

route the first packet to the storage entity using a demultiplexer of the data management system that is configured to monitor the port when the storage entity operates to receive packets in a server mode via the port, the demultiplexer configured to identify the storage entity based at least in part on an internet protocol address associated with the host;

transmit, from the storage entity based at least in part on receiving the first packet, a second packet to a domain controller within the network, wherein the second packet requests that the domain controller authenticate the host, and wherein the second packet bypasses the demultiplexer based at least in part on the demultiplexer being configured not to monitor the port when the storage entity operates to transmit packets in a client mode via the port;

receive, at the storage entity from the domain controller, a third packet that indicates an authentication of the host, wherein the third packet bypasses the demultiplexer based at least in part on being in response to the second packet; and establish the connection between the storage entity and the host based at least in part on the authentication of the host indicated by the third packet.

* * * * *